US008488623B2

(12) United States Patent
Duwel et al.

(10) Patent No.: US 8,488,623 B2
(45) Date of Patent: Jul. 16, 2013

(54) SCALABLE INTERCONNECT MODULES WITH FLEXIBLE CHANNEL BONDING

(75) Inventors: Keith Duwel, San Jose, CA (US); Michael Menghui Zheng, Fremont, CA (US); Vinson Chan, San Jose, CA (US); Kalyan Kankipati, San Jose, CA (US)

(73) Assignee: Altera Corporation, San Jose, CA (US)

( * ) Notice: Subject to any disclaimer, the term of this patent is extended or adjusted under 35 U.S.C. 154(b) by 260 days.

(21) Appl. No.: 12/845,672

(22) Filed: Jul. 28, 2010

(65) Prior Publication Data

US 2012/0027026 A1    Feb. 2, 2012

(51) Int. Cl.
*H04J 3/16*    (2006.01)
*H04J 3/22*    (2006.01)
*H04J 3/06*    (2006.01)

(52) U.S. Cl.
USPC .......................................... 370/465; 370/503

(58) Field of Classification Search
None
See application file for complete search history.

(56) References Cited

U.S. PATENT DOCUMENTS

| | | | |
|---|---|---|---|
| 5,856,999 A | 1/1999 | Robinson et al. | |
| 6,563,821 B1 | 5/2003 | Hong et al. | |
| 7,020,472 B2 | 3/2006 | Schmidt | |
| 7,099,426 B1 * | 8/2006 | Cory et al. | 375/372 |
| 7,106,760 B1 | 9/2006 | Perumal et al. | |
| 7,245,240 B1 | 7/2007 | Nguyen et al. | |
| 7,295,639 B1 | 11/2007 | Cory | |
| 7,382,823 B1 | 6/2008 | Cory | |
| 7,404,023 B1 | 7/2008 | Kaszynski | |
| 7,421,014 B2 | 9/2008 | Kryzak et al. | |
| 7,573,884 B2 | 8/2009 | Klimker et al. | |
| 7,602,212 B1 | 10/2009 | Chan et al. | |
| 7,653,138 B2 | 1/2010 | Duvaut et al. | |
| 7,684,807 B2 | 3/2010 | Schmidt | |
| 2002/0075903 A1 * | 6/2002 | Hind | 370/503 |
| 2002/0114276 A1 * | 8/2002 | Basturk | 370/230 |
| 2003/0039262 A1 | 2/2003 | Wong et al. | |
| 2003/0107999 A1 * | 6/2003 | Peleg et al. | 370/252 |
| 2005/0207450 A1 * | 9/2005 | Nguyen et al. | 370/498 |
| 2007/0258491 A1 * | 11/2007 | Reitlingshoefer et al. | 370/535 |
| 2008/0205437 A1 * | 8/2008 | Cole | 370/464 |
| 2009/0190690 A1 * | 7/2009 | Kuwata | 375/291 |
| 2009/0310616 A1 * | 12/2009 | Cummings et al. | 370/401 |
| 2010/0229067 A1 * | 9/2010 | Ganga et al. | 714/752 |
| 2011/0246810 A1 * | 10/2011 | Wessel et al. | 713/501 |

OTHER PUBLICATIONS

PCT International Search Report for Application No. PCT/US2011/044076, 2 sheets, Dec. 6, 2011.
International Preliminary Report on Patentability for Application No. PCT/US2011/044076, Mar. 19, 2013, 6 sheets.

* cited by examiner

*Primary Examiner* — Xavier S. Wong
(74) *Attorney, Agent, or Firm* — Okamoto & Benedicto LLP

(57) ABSTRACT

The present application discloses apparatus and methods for increasing channel utilization for a high-speed serial interface of an integrated circuit (IC). A new circuit architecture is disclosed which provides circuitry that may be programmed flexibly to support a multitude of different channel bonding schemes. In accordance with one aspect of the invention, the new architecture decouples the granularity of control-signal channel bonding from the granularity of data-aggregation channel bonding. This advantageously allows optimization of configurations for both types of channel bonding. In another aspect of the invention, the logical boundaries of bonded user channels are decoupled from the physical boundaries of the PCS modules. This decoupling advantageously eliminates a rigid constraint of previous architectures.

24 Claims, 24 Drawing Sheets

100

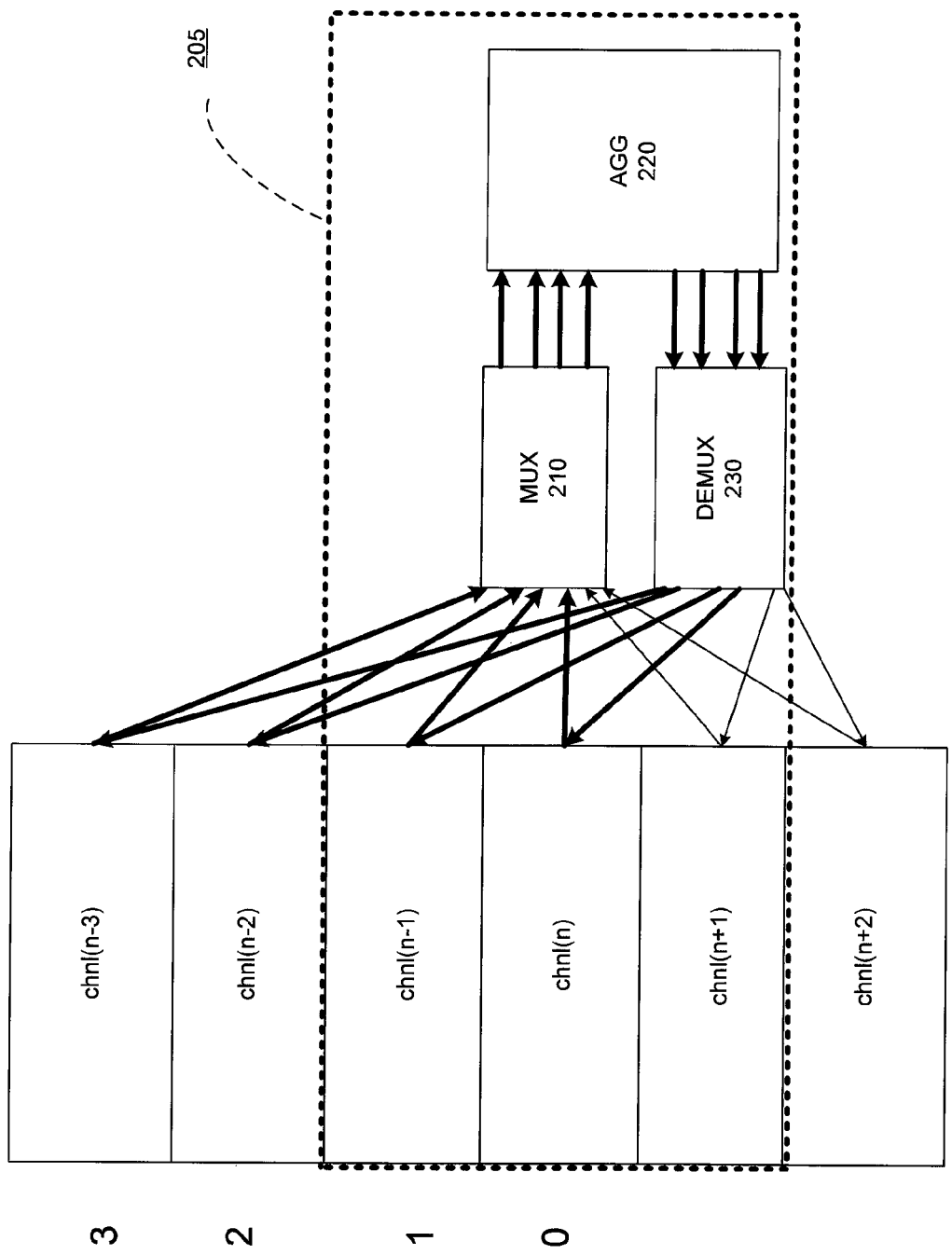

SCALABLE INTERCONNECT MODULES WITH FLEXIBLE CHANNEL BONDING

BACKGROUND

1. Technical Field

The present invention relates generally to the area of system to interconnect technology.

2. Description of the Background Art

There is increasing interest in the use of high-speed serial data communication for exchange of data between the devices that make up various types of systems. There are many possible protocols for such high-speed serial interfaces (HSSI). Some of these protocols may be industry-standard protocols. Other protocols may be custom-designed for particular systems.

A particular protocol typically involves such things as how is the data formatted; how many channels are used together to provide the overall communication link; at what speed (serial data rate or bit rate) is a channel operated; if multiple channels are employed to provide a link, how much skew (differential delay) can there be between the channels; and so forth.

Examples of industry-standard protocols include PCI Express® (Peripheral Component Interconnect Express), XAUI (X Attachment Unit Interface), sRIO (serial Rapid IO), and many others. PCI Express® is a point-to-point serial interface introduced by Intel Corporation of Santa Clara, Calif., and may be used, for example, as an expansion card interface for computer systems. XAUI is a 10 gigabit per second serial interface which may be used, for example, as a chip-to-chip interface. sRIO is a high-performance packet-switched interface technology which may also be used as a chip-to-chip interface.

SUMMARY

The present application discloses apparatus and methods for increasing channel utilization for a high-speed serial interface of an integrated circuit (IC) while maintaining low-skew performance. A new circuit architecture is disclosed which provides circuitry that may be programmed flexibly to support a multitude of different channel bonding schemes. In accordance with one aspect of the invention, the new architecture decouples the granularity of control-plane channel bonding from the granularity of data-aggregation channel bonding. This advantageously allows optimization of configurations for both types of channel bonding. In another aspect of the invention, the logical boundaries of bonded user channels are decoupled from the physical boundaries of physical coding sublayer (PCS) modules. This decoupling advantageously eliminates a rigid constraint of previous architectures.

BRIEF DESCRIPTION OF THE DRAWINGS

FIGS. 6A, 6B, 6C and 6D show exemplary multiplexer configuration modes for four-channel (x4) data-aggregation bonding in accordance with an embodiment of the invention.

In FIG. 7A, four pairs of channels are x2 data aggregation bonded, while three quadruplets of channels are x4 data aggregation bonded in FIG. 7B.

In FIG. 8A, five pairs of channels are x2 data aggregation bonded, while three quadruplets of channels are x4 data aggregation bonded in FIG. 8B.

DETAILED DESCRIPTION

Multiple serial channels between two devices may be bonded (or aggregated or bundled) together to increase bandwidth and reduce latency. These bonded serial channels work in concert as a single higher-bandwidth link. In accordance with an embodiment of the invention, scalable circuit modules are disclosed which are advantageous in their flexibility in forming multiple-channel bundles such that high channel utilization is achievable. In addition, the architecture of the modules is reusable and results in efficient resource usage, power savings, and low area overhead.

Figure 1:
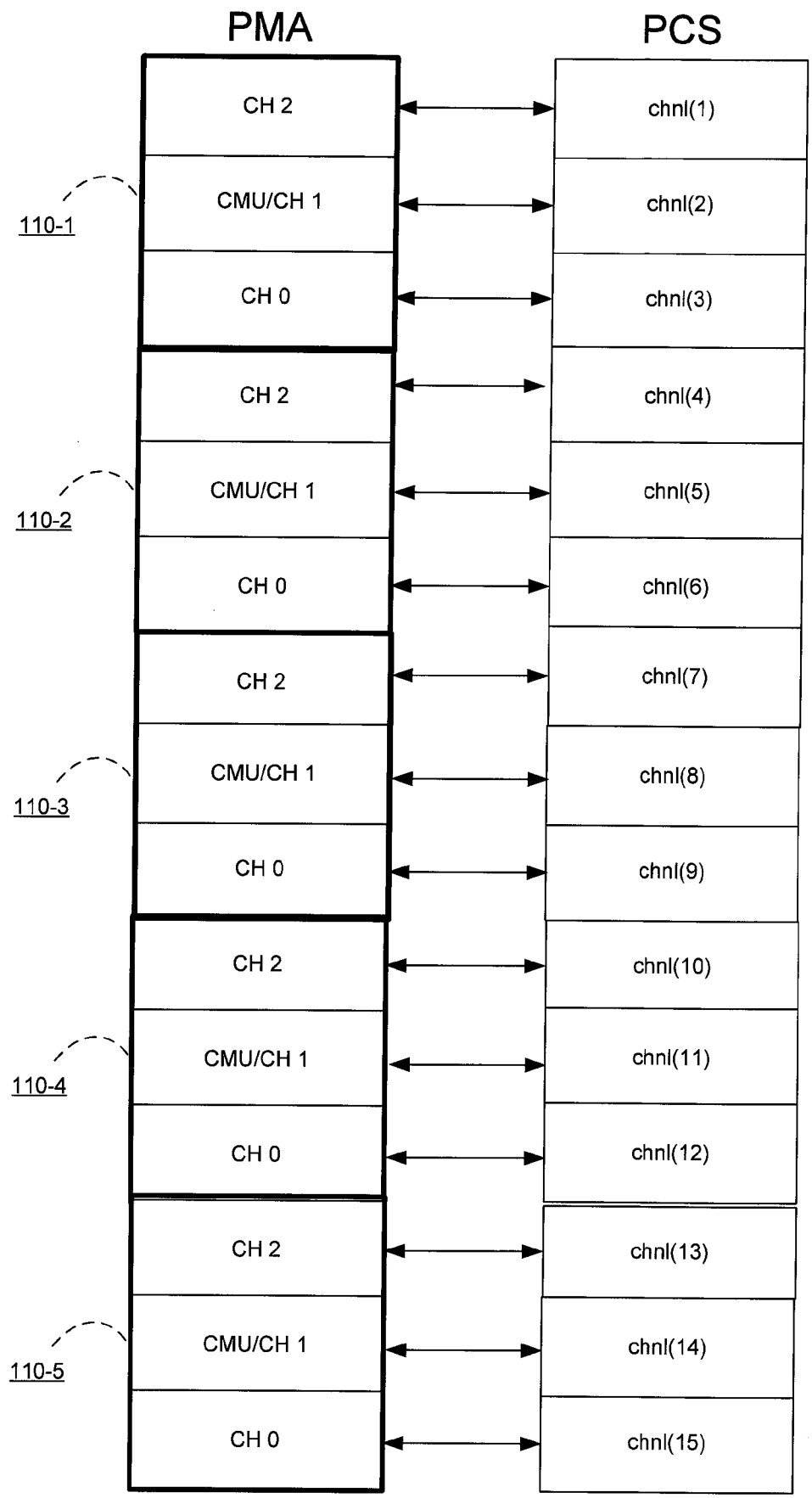
FIG. 1 is a high-level diagram of circuit blocks arranged to provide multiple high-speed serial data channels in accordance with an embodiment of the invention.

FIG. 1 is a high-level diagram of circuit blocks arranged to provide multiple high-speed serial data channels in accordance with an embodiment of the invention. Shown are physical media attachment (PMA) circuit blocks for fifteen data channels and corresponding physical coding sublayer (PCS) circuit blocks the for the fifteen data channels, each data channel corresponding to a stream of data being received to or transmitted from the integrated circuit. The number of data channels may be different from fifteen in other embodiments of the invention.

The PCS circuit blocks generally provides digital logic functions which implement data communication protocols, while the PMA circuit blocks generally provides mixed (analog/digital) signal functionality for the data communications. For example, for certain protocols, a PCS circuit block may be configured to perform, among other functions, 8-bit (octet) to 10-bit encoding for data to be sent to a PMA circuit block and 10-bit to 8-bit decoding for data received from the PMA circuit block. A PMA circuit block may be configured to perform, among other operations, serialization of data to be transmitted (conversion from parallel to serial) and de-serialization of received data (conversion from serial to parallel).

In accordance with the particular embodiment shown in FIG. 1, the fifteen PMA circuit blocks (PMA channels) are grouped into an array of five modules (110-1, 110-2, 110-3, 110-4, and 110-5) of three channels each (i.e. into five PMA "triplet" modules). Each PMA triplet module 110 may include a first channel CH0, a second channel CMU/CH1, and a third channel CH2. The second channel may be configured into a transceiver channel (CH1) or as a transmit clock source. As such, a PMA triplet module 110 may be configurable into three transceiver channels, or two transceiver channels and a transmit clock source.

Correspondingly, in this particular embodiment, there are fifteen PCS circuit blocks (PCS channels). As shown, each PCS channel may be denoted chnl(n), where n is the channel number.

One advantageous aspect of the presently-disclosed circuitry and method for PCS channel bonding is that the circuitry for "data-aggregation" bonding is decoupled and separated from the circuitry for "control-plane" bonding. As the terms are used herein, control-plane bonding is set-up along with other initial conditions of a connection. Control-plane bonding is set-up based only on control signals and is independent of the content of the data traffic. In contrast, data-aggregation bonding is not restricted to the initialization phase of a connection. Rather, data-aggregation bonding may change status at various times during a connection depending on the content of the data traffic in the channels.

A flexible circuit architecture for data-aggregation bonding is described below in relation to FIGS. 2 through 9, 11 and 12. A flexible circuit architecture for control-plane bonding is described below in relation to FIGS. 10A and 10B.

Figure 2:
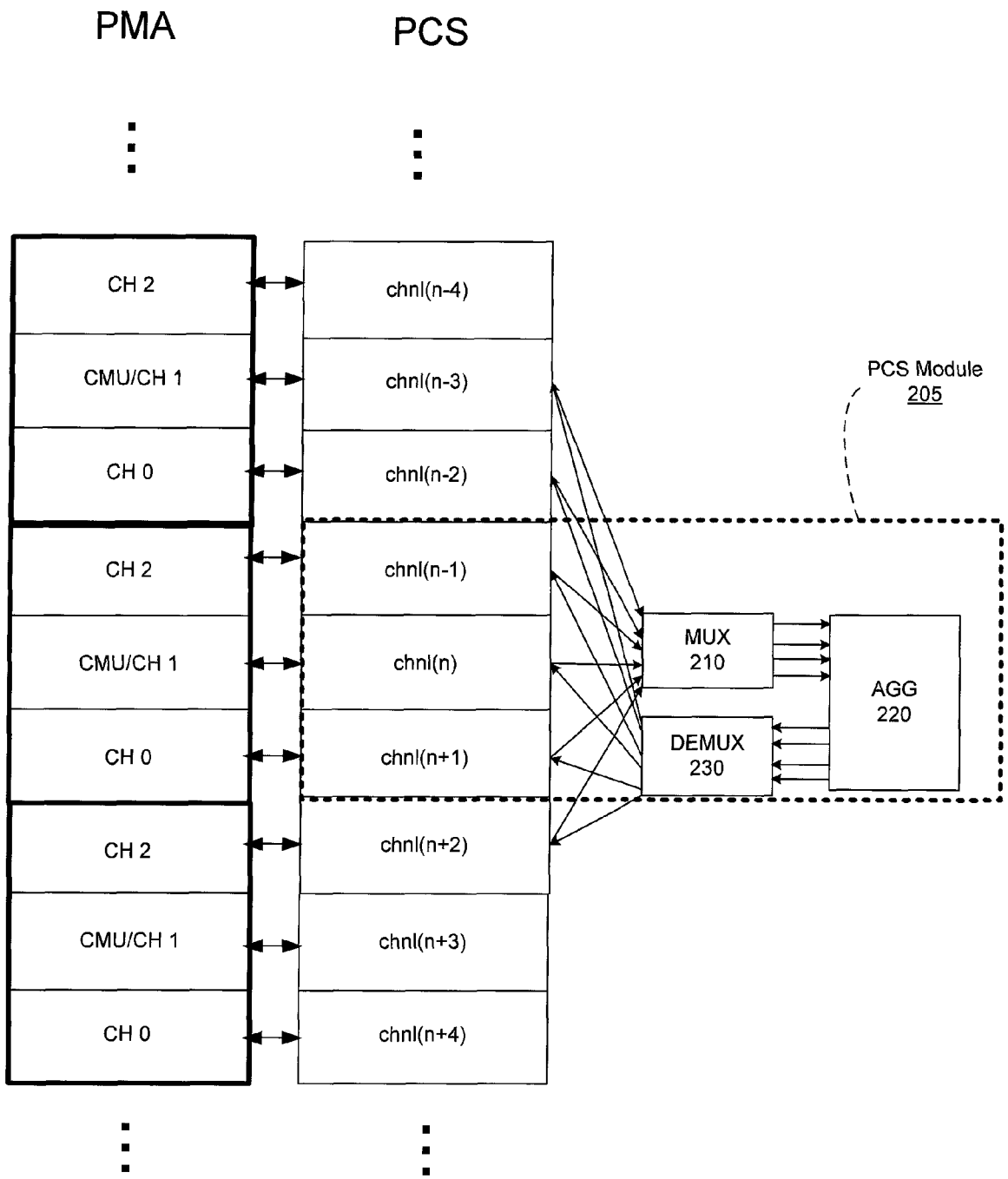
FIG. 2 shows a PCS module which includes circuit blocks for data aggregation in accordance with an embodiment of the invention.

A flexible circuit architecture for data aggregation bonding is now described. FIG. 2 shows a PCS module 205 which includes circuit blocks for data aggregation in accordance with an embodiment of the invention. Such data-aggregation bonding is required under certain HSSI protocols.

As seen, the PCS module 205 in this embodiment is associated with three PCS channels (a triplet of PCS channels) and includes three additional circuit blocks. The three additional circuit blocks are a channel multiplexer (MUX) 210, data aggregation circuits and logic (AGG) 220, and a channel demultiplexer (DEMUX) 230.

In FIG. 2, the channel MUX 210 communicatively connects the PCS circuitry for multiple data channels to channel inputs of the data aggregation circuits and logic 220, and the channel DEMUX 230 connects the channel outputs of the data aggregation circuits and logic 220 back to the PCS circuitry for the multiple data channels. In this particular embodiment, six neighboring data channels, chnl(n−3) through chnl(n+2), are communicatively interconnected with the data aggregation circuits and logic 220. Other numbers of data channels may be interconnected with the data aggregation circuits and logic 220 in other embodiments.

Figure 3:
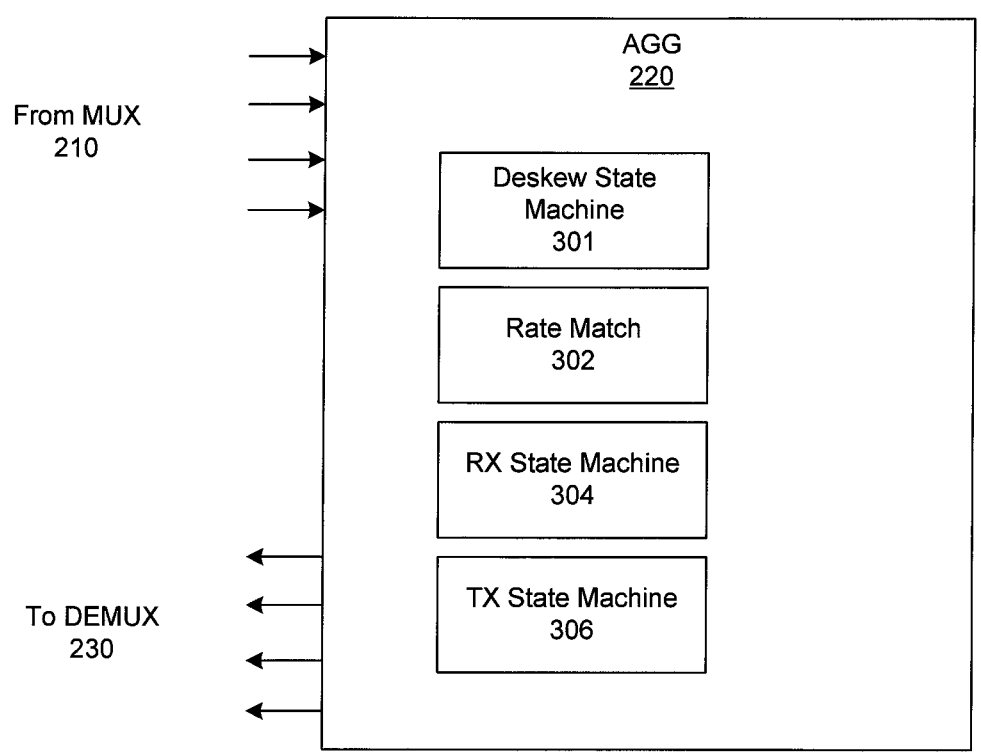
FIG. 3 shows select components of a data aggregation circuit block in accordance with an embodiment of the invention.

FIG. 3 is a diagram showing select components of a data aggregation circuit block 220 in accordance with an embodiment of the invention. As shown, the components may include a de-skew state machine 301, rate match circuitry 302, a receive (RX) state machine 304, and a transmit (TX) state machine 306, among other components. In this example, there are four channel inputs from an associated MUX 210 and four channel outputs to an associated DEMUX 230.

Under certain high-speed serial interface protocols, when multiple data channels (for example, a pair of channels, a quadruplet of channels, or other grouping of channels) are bundled together for purposes of providing a single higher-speed connection, various clock and/or control signals for those channels may be required to be synchronized and/or otherwise coordinated.

The aggregation performed by the data aggregation circuit block 220 may involve the transformation of data or the control of data in an individual PCS channel based on the data of each channel for multi-lane configurations, such as XAUI (four lane configurations), SRIO (X2 or X4), and certain proprietary protocols. Some of the aggregation functions that may be performed by the data aggregation circuit block 220 for multi-lane configurations include the following.

Deskew Control
Protocol specific (XAUI, SRIO)
Proprietary
Rate Matching Control
Protocol specific (XAUI, SRIO)
Proprietary
Transmit and Receive State Machines
Protocol specific (XAUI)

An illustrative deskew operation that may be performed by a deskew state machine 301 is described below in relation to FIG. 15. An illustrative transformation that may be performed by a receive state machine 304 of a data aggregator is described below in relation to FIG. 16.

Figure 4:
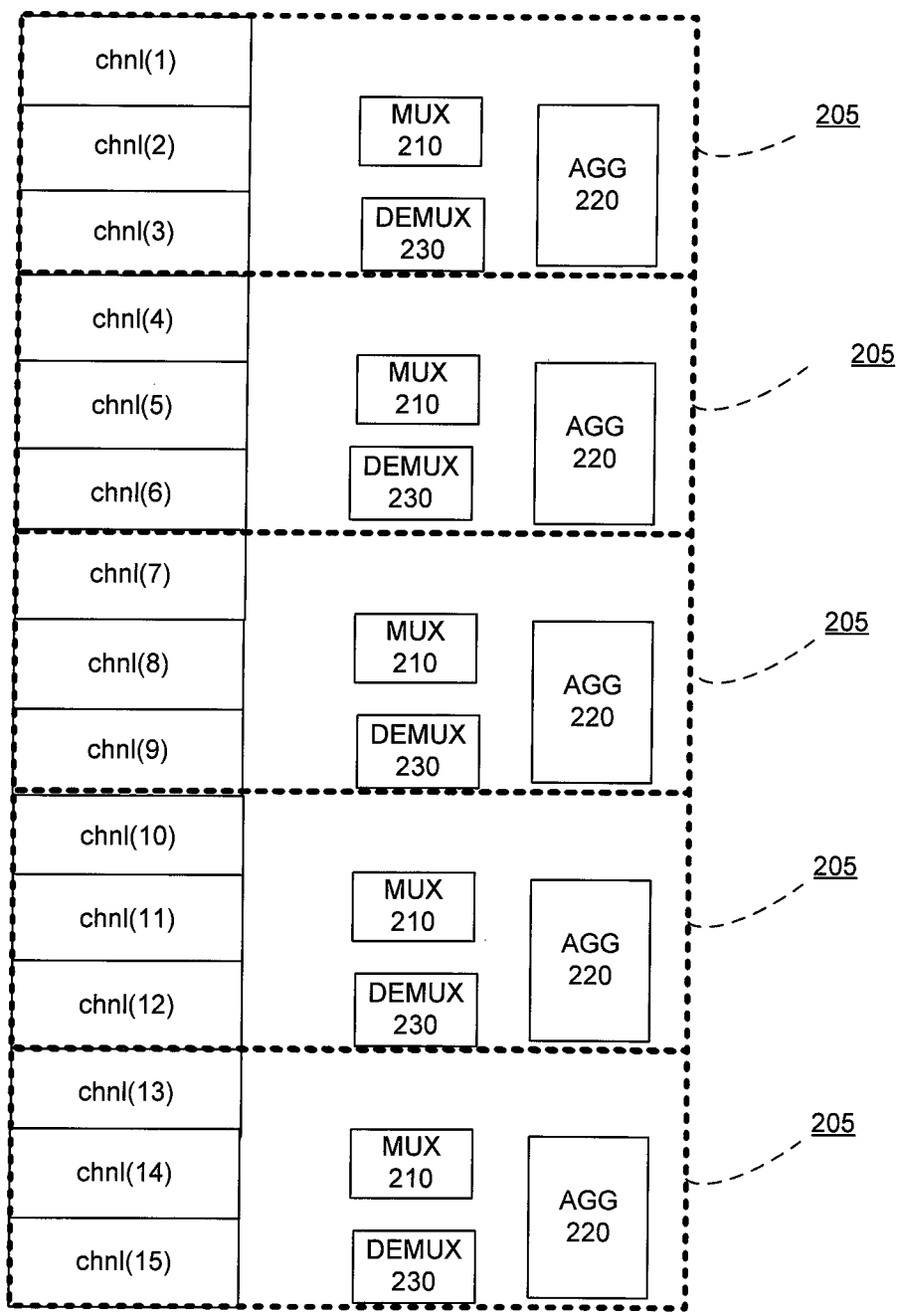
FIG. 4 shows several PCS modules in an array in accordance with an embodiment of the invention.

FIG. 4 shows several PCS modules 205 in accordance with an embodiment of the invention. In this particular example, five data-aggregation circuit blocks 220 are coupled to an array of fifteen serial data channels, chnl(1) through chnl(15). As shown, the coupling is provided by five channel MUX circuit blocks 210 and five channel DEMUX circuit blocks 230. Note that, while interconnections between the various circuit blocks are present as shown in FIG. 2, these interconnection are not shown in FIG. 4 for ease of illustration and understanding.

Note also that the PCS modules 205 at the ends of the array would not have interconnections to channels that do not exist. For example, the PCS module 205 associated with chnl(1) through chnl(3) would not have the interconnections with channels lower in number than chnl(1) and the PCS module 205 associated with chnl(13) through chnl(15) would not have interconnections with channels higher in number than chnl(15). These PCS modules 205 at the ends of the array would not be programmable to configurations that use the "missing" channels.

Figure 5A:
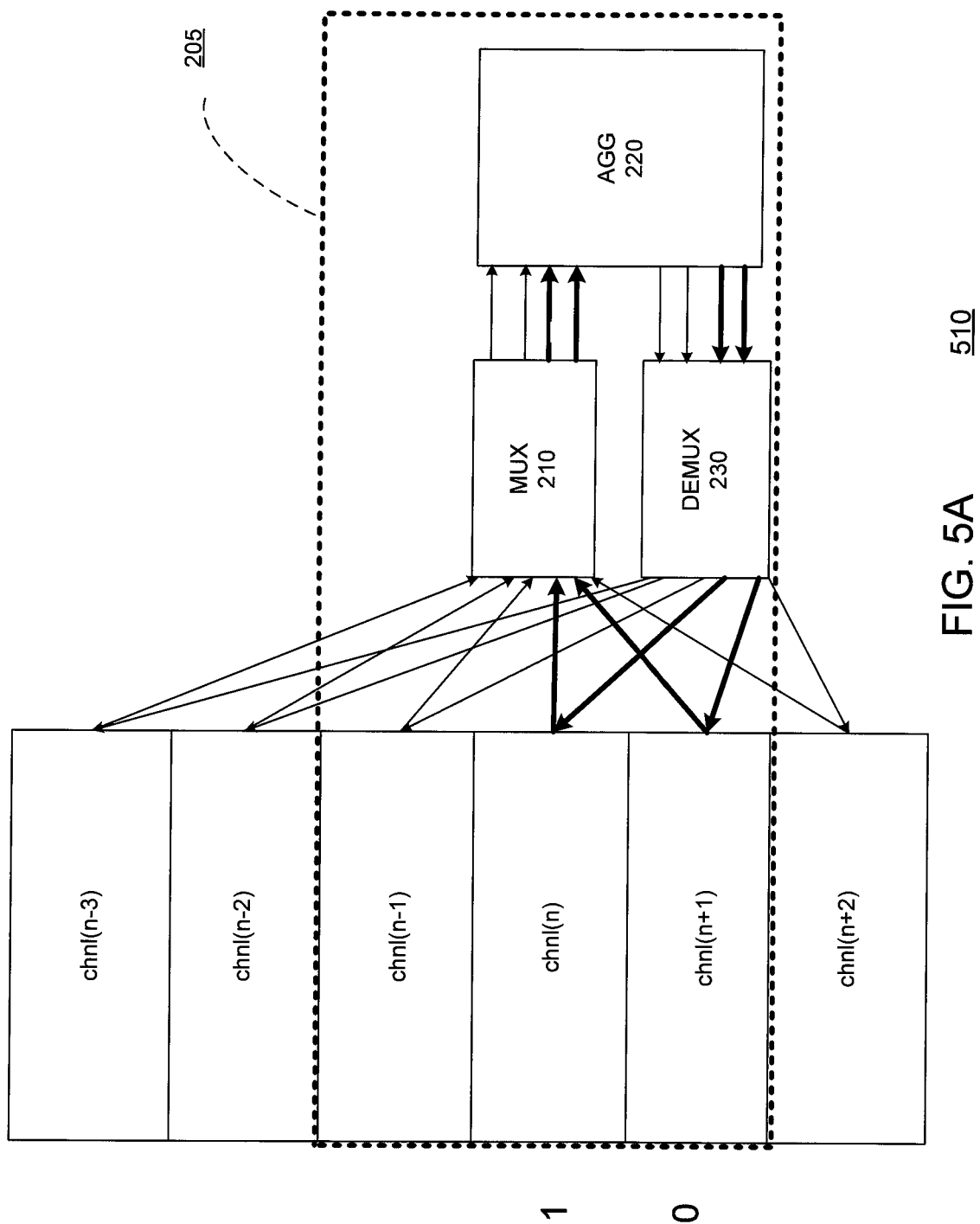
FIGS. 5A and 5B show exemplary multiplexer configuration modes for two-channel (x2) data-aggregation bonding in accordance with an embodiment of the invention.
Figure 5B:
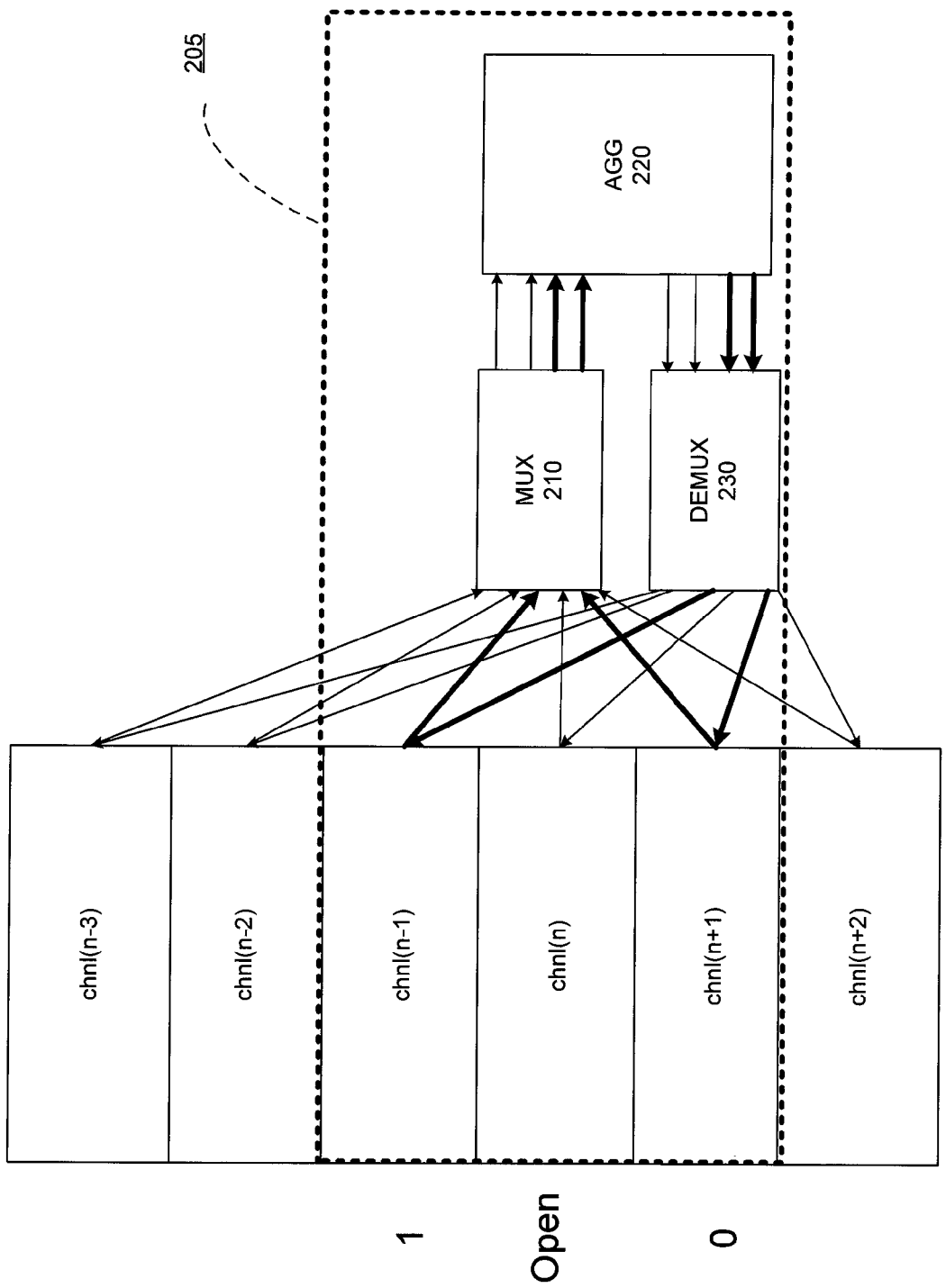

FIGS. 5A and 5B show exemplary multiplexer configuration modes for two-channel (x2) data-aggregation bonding in accordance with an embodiment of the invention. While FIGS. 5A and 5B shown two exemplary modes for x2 bonding, various other x2 bonding modes may be configured or programmed using the flexible circuit architecture disclosed herein.

The multiplexer configuration mode 510 shown in FIG. 5A may be used for the data-aggregation bonding of two adjacent data channels. In this case, MUX 210 of PCS module 205 is configured to select channels chnl(n+1) and chnl(n) such that data signals from those channels are passed to two of the channel inputs of data-aggregation circuit block 220. Correspondingly, DEMUX 230 of the same PCS module 205 is configured such that two of the channel outputs of the data-aggregation circuit block 220 are passed back to the selected channels chnl(n+1) and chnl(n). This configuration is shown by the thicker arrows going from chnl(n+1) and chnl(n) to MUX 210 and the thicker arrows going from DEMUX 230 back to chnl(n+1) and chnl(n). (The thinner arrows represent connections to channels which are not selected by the MUX 210 and DEMUX 230.) In addition, the "0" next to chnl(n+1) and the "1" next to chnl(n) indicate that those channels are x2 bonded.

The multiplexer configuration mode 520 shown in FIG. 5B may be used for the data-aggregation bonding of two non-adjacent data channels. In this case, MUX 210 of PCS module 205 is configured to select channels chnl(n+1) and chnl(n−1) such that data signals from those channels are passed to two of the channel inputs of data-aggregation circuit block 220. Correspondingly, DEMUX 230 of the same PCS module 205 is configured such that two of the channel outputs of the data-aggregation circuit block 220 are passed back to the selected channels chnl(n+1) and chnl(n−1). This configuration is shown by the thicker arrows going from chnl(n+1) and chnl(n−1) to MUX 210 and the thicker arrows going from DEMUX 230 back to chnl(n+1) and chnl(n−1). In addition, the "0" next to chnl(n+1) and the "1" next to chnl(n−1) indicate that those channels are x2 bonded. The "Open" next to chnl(n) indicates that the circuitry corresponding to this channel is opened to be configured for other purposes. For example, the corresponding PMA channel (CMU/CH) may be configured for use as a transmit clock source.

FIGS. 6A, 6B, 6C and 6D show exemplary multiplexer configuration modes for four-channel (x4) data-aggregation bonding in accordance with an embodiment of the invention. While FIGS. 6A through 6D shown four exemplary modes for x4 bonding, various other x4 bonding modes may be configured or programmed using the flexible circuit architecture disclosed herein.

The multiplexer configuration mode 610 shown in FIG. 6A may be used for the data-aggregation bonding of four adjacent data channels. In this case, MUX 210 is configured to select channels chnl(n), chnl(n−1), chnl(n−2), and chnl(n−3) such that data signals from those channels are passed to the four channel inputs of data-aggregation circuit block 220. Correspondingly, DEMUX 230 is configured such that the four channel outputs of the data-aggregation circuit block 220 are passed back to the selected channels chnl(n) through chnl(n−3). This configuration is shown by the thicker arrows going from chnl(n) through chnl(n−3) to MUX 210 and the thicker arrows going from DEMUX 230 back to chnl(n) through chnl(n−3). In addition, the "0" next to chnl(n), the "1" next to chnl(n−1), the "2" next to chnl(n−2), and the "3" next to chnl(n−3) indicate that those four channels are x4 bonded.

Figure 6B:
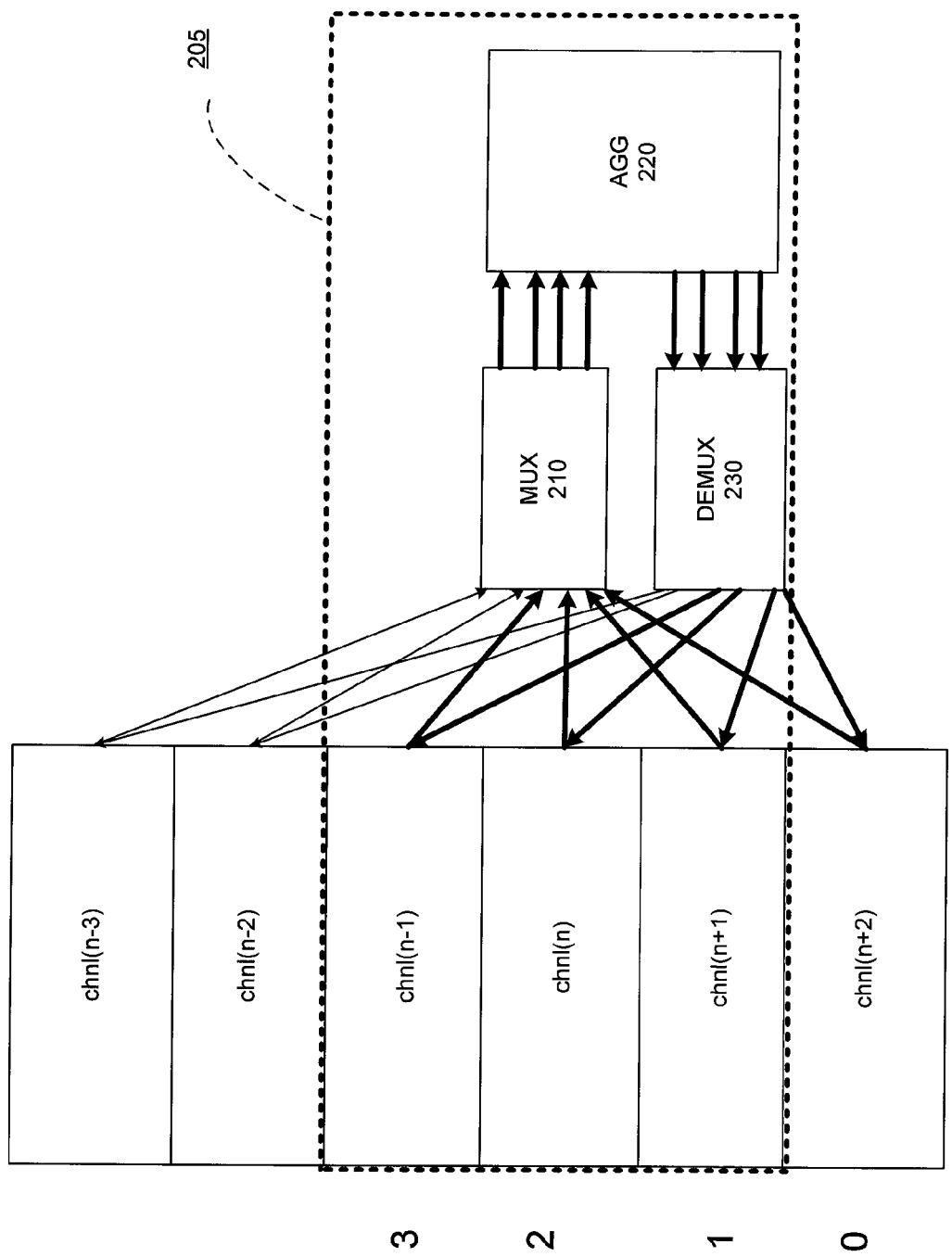

The multiplexer configuration mode 620 shown in FIG. 6B may also be used for the data-aggregation bonding of four adjacent data channels. In this case, MUX 210 is configured to select channels chnl(+2), chnl(n+1), chnl(n), and chnl(n−1) such that data signals from those channels are passed to the four channel inputs of data-aggregation circuit block 220. Correspondingly, DEMUX 230 is configured such that the four channel outputs of the data-aggregation circuit block 220 are passed back to the selected channels chnl(n+2) through chnl(n−1). This configuration is shown by the thicker arrows going from chnl(n+2) through chnl(n−1) to MUX 210 and the thicker arrows going from DEMUX 230 back to chnl(n+2) through chnl(n−1). In addition, the "0" next to chnl(n+2), the "1" next to chnl(n+1), the "2" next to chnl(n), and the "3" next to chnl(n−1) indicate that those four channels are x4 bonded.

Figure 6C:
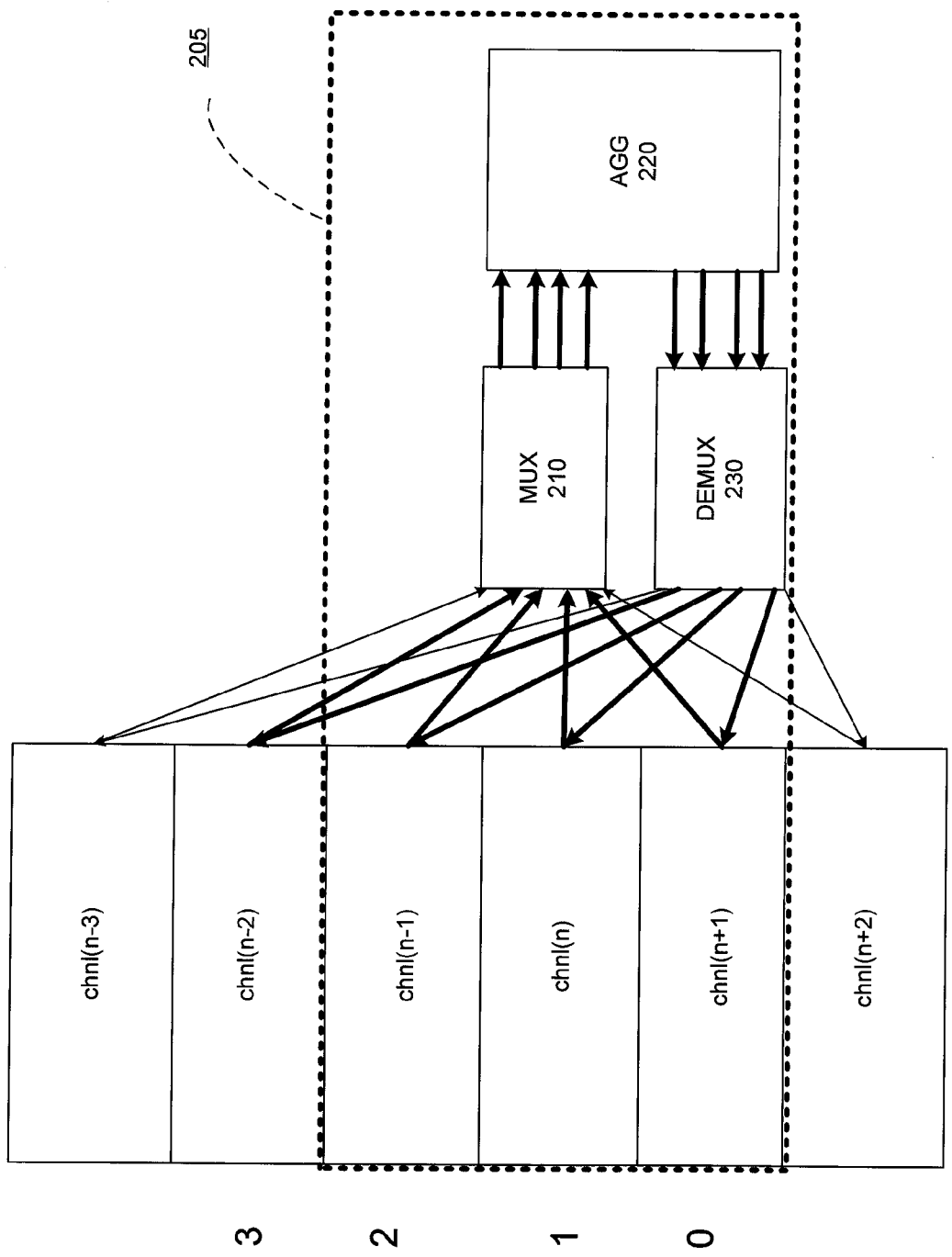

The multiplexer configuration mode 630 shown in FIG. 6C may also be used for the data-aggregation bonding of four adjacent data channels. In this case, MUX 210 is configured to select channels chnl(n+1), chnl(n), chnl(n−1), and chnl(n−2) such that data signals from those channels are passed to the four channel inputs of data-aggregation circuit block 220. Correspondingly, DEMUX 230 is configured such that the four channel outputs of the data-aggregation circuit block 220 are passed back to the selected channels chnl(n+1) through chnl(n−2). This configuration is shown by the thicker arrows going from chnl(n+1) through chnl(n−2) to MUX 210 and the thicker arrows going from DEMUX 230 back to chnl(n+1) through chnl(n−2). In addition, the "0" next to chnl(n+1), the "1" next to chnl(n), the "2" next to chnl(n−1), and the "3" next to chnl(n−2) indicate that those four channels are x4 bonded.

Figure 6D:
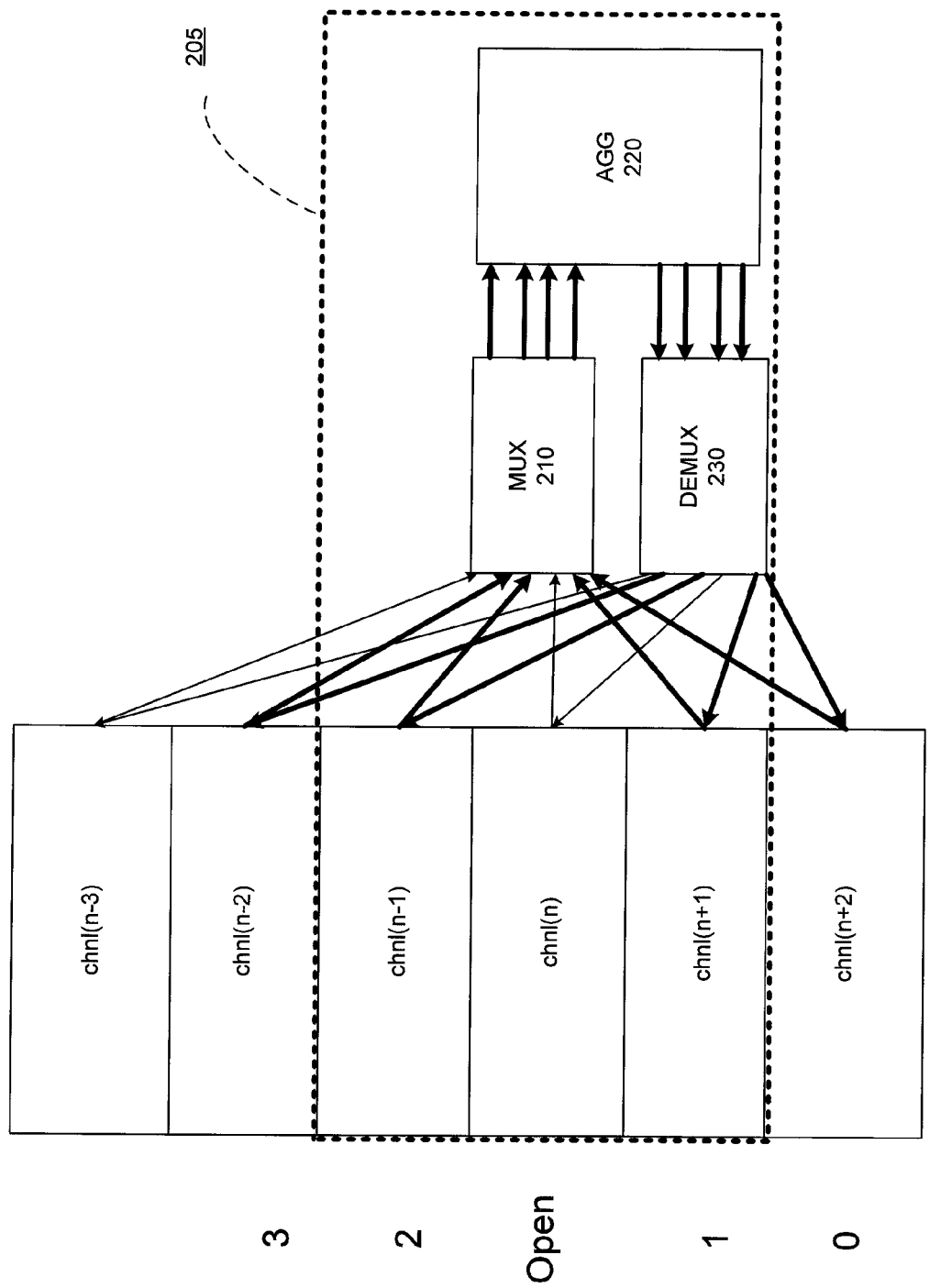

Finally, the multiplexer configuration mode 640 shown in FIG. 6D may be used for the data-aggregation bonding of four data channels, where one data channel is skipped. In this case, MUX 210 is configured to select channels chnl(n+2), chnl(n+1), chnl(n−1), and chnl(n−2), skipping chnl(n), such that data signals from those selected channels are passed to the four channel inputs of data-aggregation circuit block 220. Correspondingly, DEMUX 230 is configured such that the four channel outputs of the data-aggregation circuit block 220 are passed back to the selected channels chnl(n+2), chnl(n+1), chnl(n−1), and chnl(n−2). This configuration is shown by the thicker arrows going from chnl(n+2), chnl(n+1), chnl(n−1), and chnl(n−2) to MUX 210 and the thicker arrows going from DEMUX 230 back to chnl(n+2), chnl(n+1), chnl(n−1), and chnl(n−2). In addition, the "0" next to chnl(n+2), the "1" next to chnl(n+1), the "2" next to chnl(n−1), and the "3" next to chnl(n−2) indicate that those four channels are x4 bonded. Note also that chnl(n) is an open channel that may also be used, for example, as a single (un-bonded) channel.

As is understood by one of ordinary skill in the pertinent art, other numbers of channels (not just two or four) may be data-aggregation bonded using the inventive circuit architecture disclosed herein. The MUX 210 and DEMUX 230 circuits in FIGS. 5A through 6D are shown as being interconnected with six data channels, but they may be interconnected with any number of data channels in other embodiments. Also, the AGG 220 circuit block is shown with four channel inputs and outputs. However, it may have another number of channel inputs and outputs. For example, if x8 bonding is to be supported, then AGG 220 should have at least eight channel inputs and outputs.

Figure 7A:
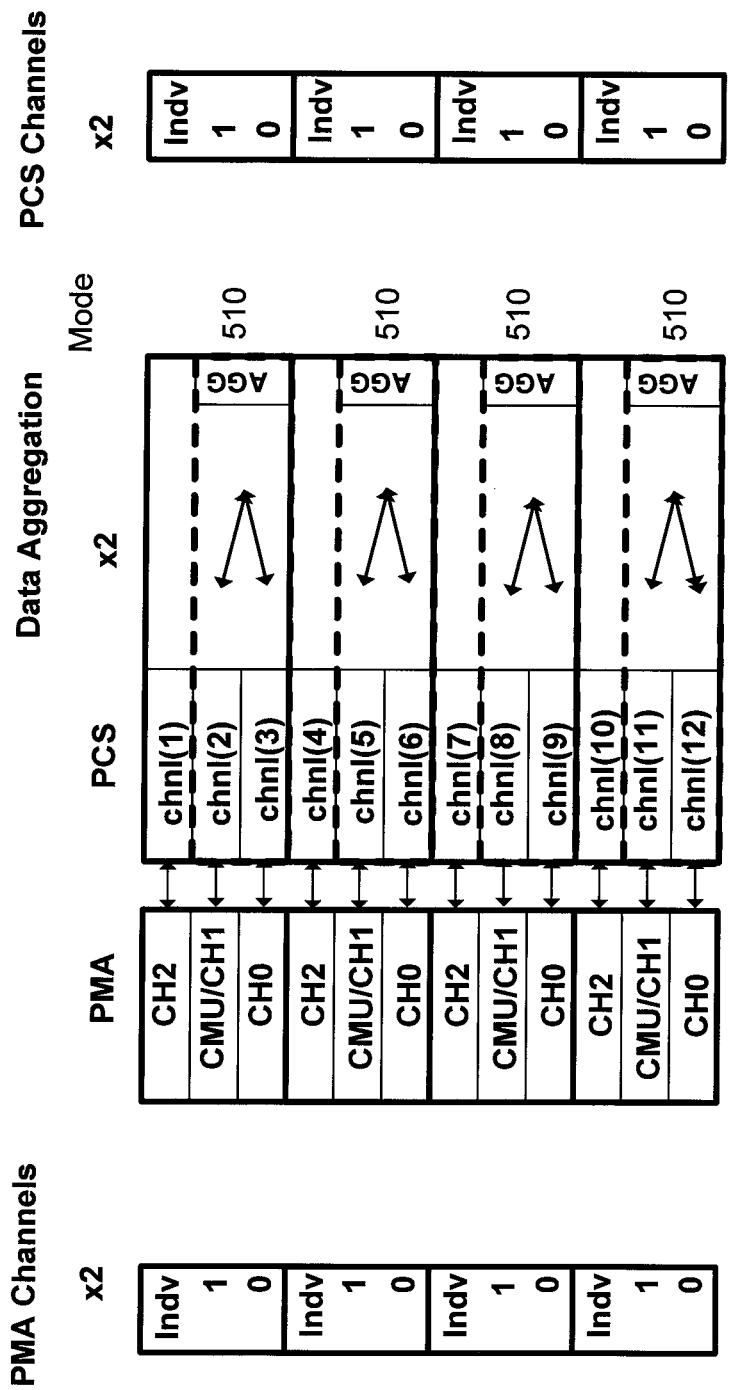
FIGS. 7A and 7B show an example array of twelve serial channels in accordance with an embodiment of the invention.
Figure 7B:
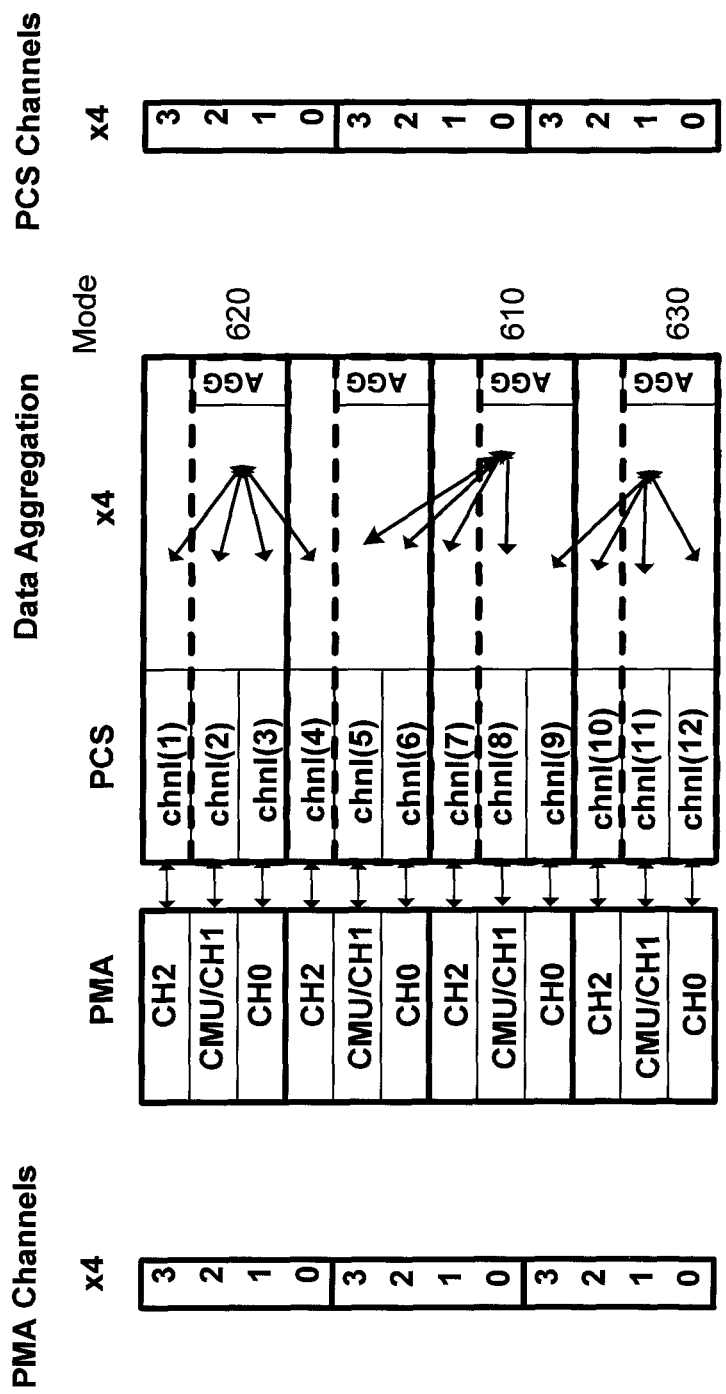

FIGS. 7A and 7B show an example array of twelve serial channels in accordance with an embodiment of the invention. In FIG. 7A, four pairs of channels are x2 data aggregation bonded, while three quadruplets of channels are x4 data aggregation bonded in FIG. 7B.

More particularly, as shown in FIG. 7A, chnl(2) and chnl(3) are x2 data-aggregation bonded. This may be accomplished, for example, by having MUX/DEMUX circuitry interconnected with those channels in configuration mode 510 as described above in relation to FIG. 5A. Similarly, x2 data-aggregation bonded connections may be configured using the channel pairs chnl(5) and chnl(6), chnl(8) and chnl(9), and chnl(11) and chnl(12). In this case, eight of the twelve data channels are used to form the four x2 data-aggregation bonded connections. The remaining four channels, chnl(1), chnl(4), chnl(7), and chnl(10), may be used as individual (Indv) non-bonded transceiver channels.

As shown in FIG. 7B, chnl(9) through chnl(12) are x4 data-aggregation bonded. This may be accomplished, for example, by having MUX/DEMUX circuitry interconnected with those channels in configuration mode 630 as described above in relation to FIG. 6C. In addition, chnl(5) through chnl(8) are x4 data-aggregation bonded by having MUX/DEMUX circuitry interconnected with those channels in configuration mode 610 as described above in relation to FIG. 6A. Finally, chnl(1) through chnl(4) are x4 data-aggregation bonded by having MUX/DEMUX circuitry interconnected with those channels in configuration mode 620 as described above in relation to FIG. 6B. In this case, the three x4 data-aggregation bonded connections are formed using twelve of the twelve data channels, providing a 100% channel utilization rate.

Figure 8A:
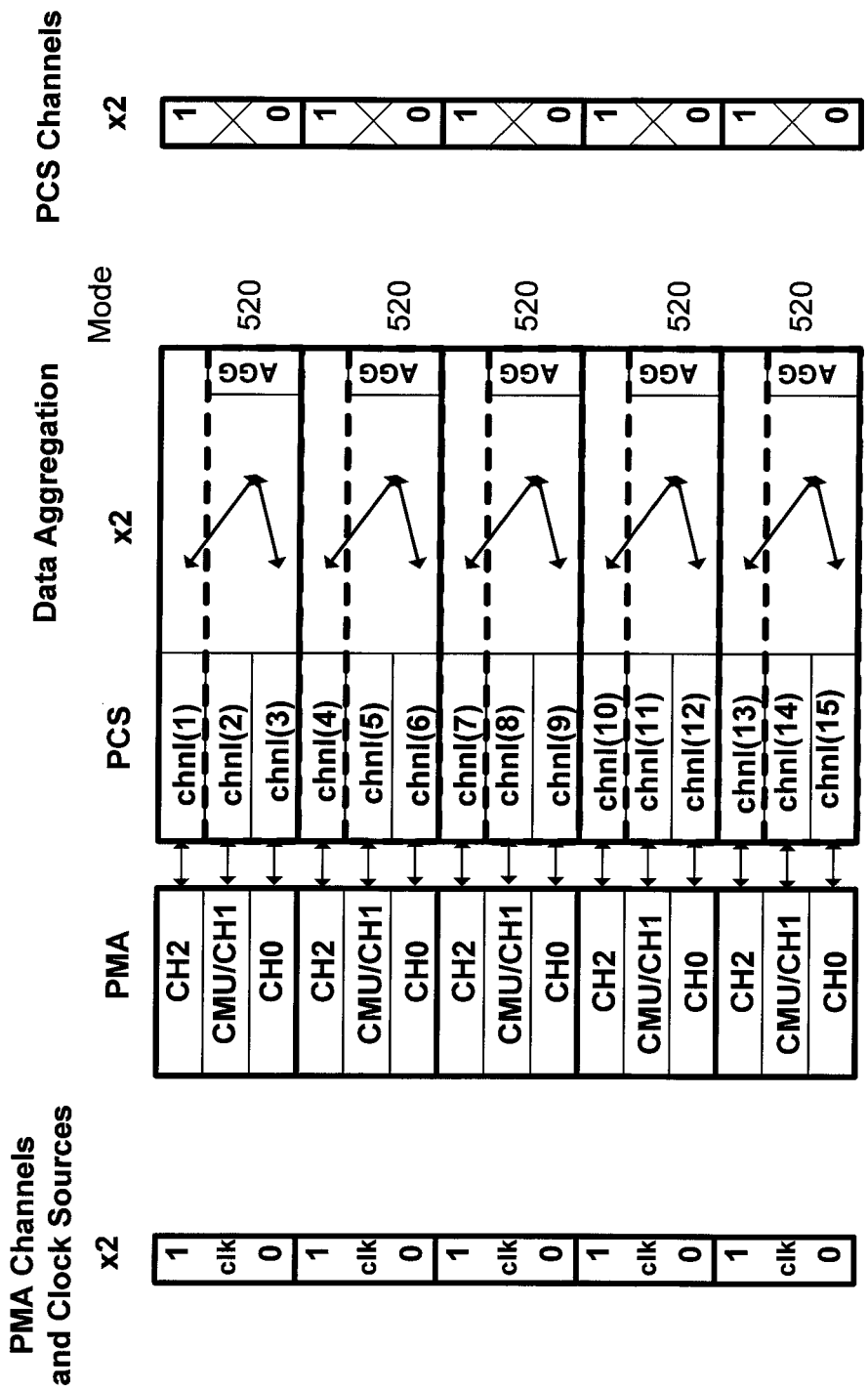
FIGS. 8A and 8B show an example array of fifteen serial channels in accordance with an embodiment of the invention.
Figure 8B:
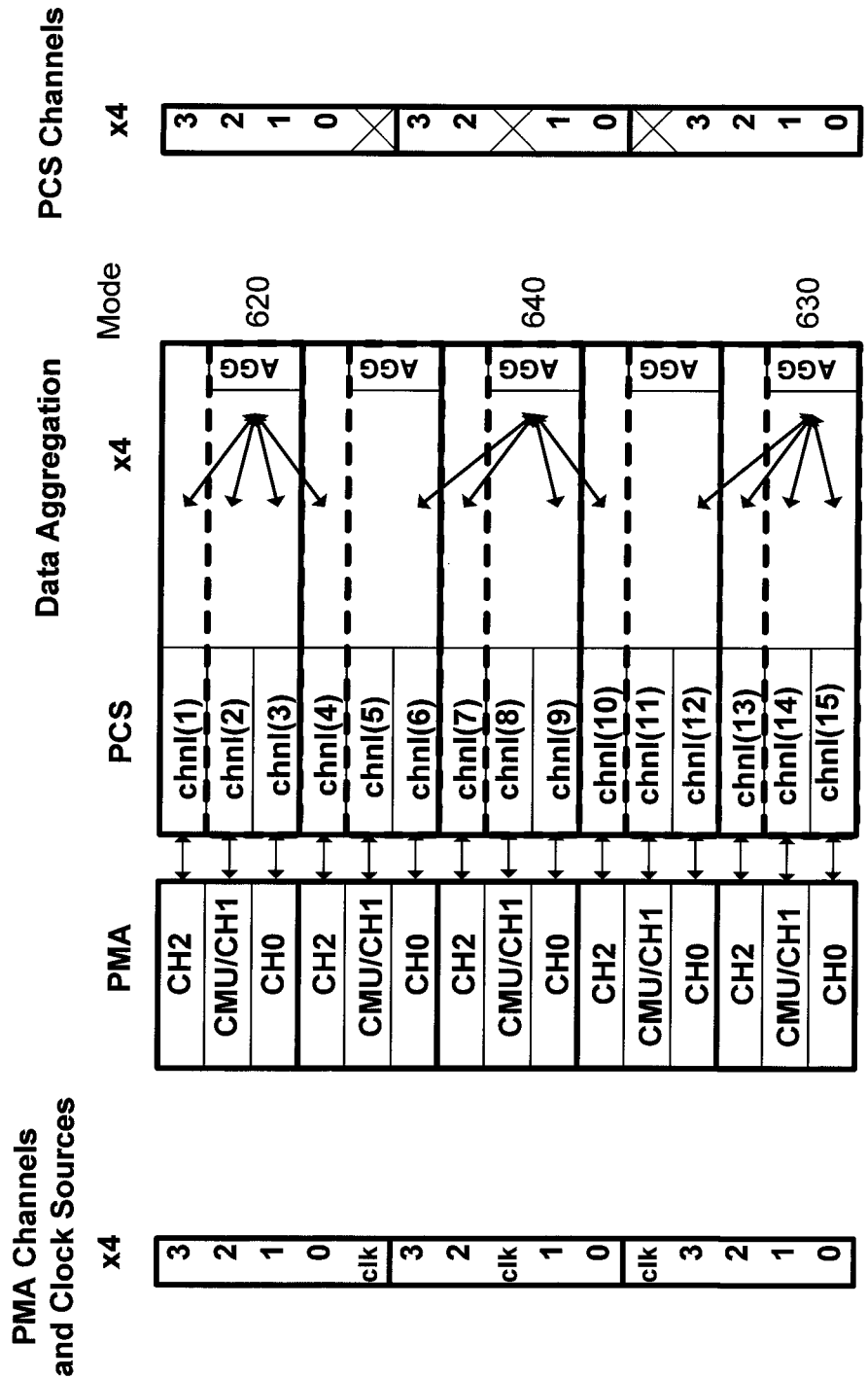

FIGS. 8A and 8B show an example array of fifteen serial channels in accordance with an embodiment of the invention. In FIG. 8A, five pairs of channels are x2 data aggregation bonded, while three quadruplets of channels are x4 data aggregation bonded in FIG. 8B.

More particularly, as shown in FIG. 8A, chnl(1) and chnl(3) are x2 data-aggregation bonded. This may be accomplished, for example, by having MUX/DEMUX circuitry interconnected with those channels in configuration mode 520 as described above in relation to FIG. 5B. Similarly, x2 data-aggregation bonded connections may be configured using the channel pairs chnl(4) and chnl(6), chnl(7) and chnl(9), and chnl(10) and chnl(12). In this case, ten of the fifteen data channels are used to form the five x2 data-aggregation bonded connections. In this case, since the PMA circuitry of the middle channel in each PMA triplet (i.e. CMU/CH1) may be configured as either a transceiver channel or a clock source, the configuration shown in FIG. 8A allows the five middle channels to be utilized as five clock sources ("clk").

As shown in FIG. 8B, chnl(12) through chnl(15) are x4 data-aggregation bonded. This may be accomplished, for example, by having MUX/DEMUX circuitry interconnected with those channels in configuration mode 630 as described above in relation to FIG. 6C. In addition, chnl(6), chnl(7), chnl(9), and chnl(10) are x4 data-aggregation bonded by having MUX/DEMUX circuitry interconnected with those channels in configuration mode 640 as described above in relation to FIG. 6D. Finally, chnl(1) through chnl(4) are x4 data-aggregation bonded by having MUX/DEMUX circuitry interconnected with those channels in configuration mode 620 as described above in relation to FIG. 6B. In this case, while twelve of the fifteen data channels are used to form the three x4 data-aggregation bonded connections, the remaining three channels, chnl(5), chnl(8), and chnl(11), each correspond to middle channels (CMU/CH1) of a PMA triplet. As such, the configuration shown in FIG. 8B allows these three remaining channels to be utilized as three clock sources (indicated by the "clk" under PMA Channels and Clock Sources).

Figure 9:
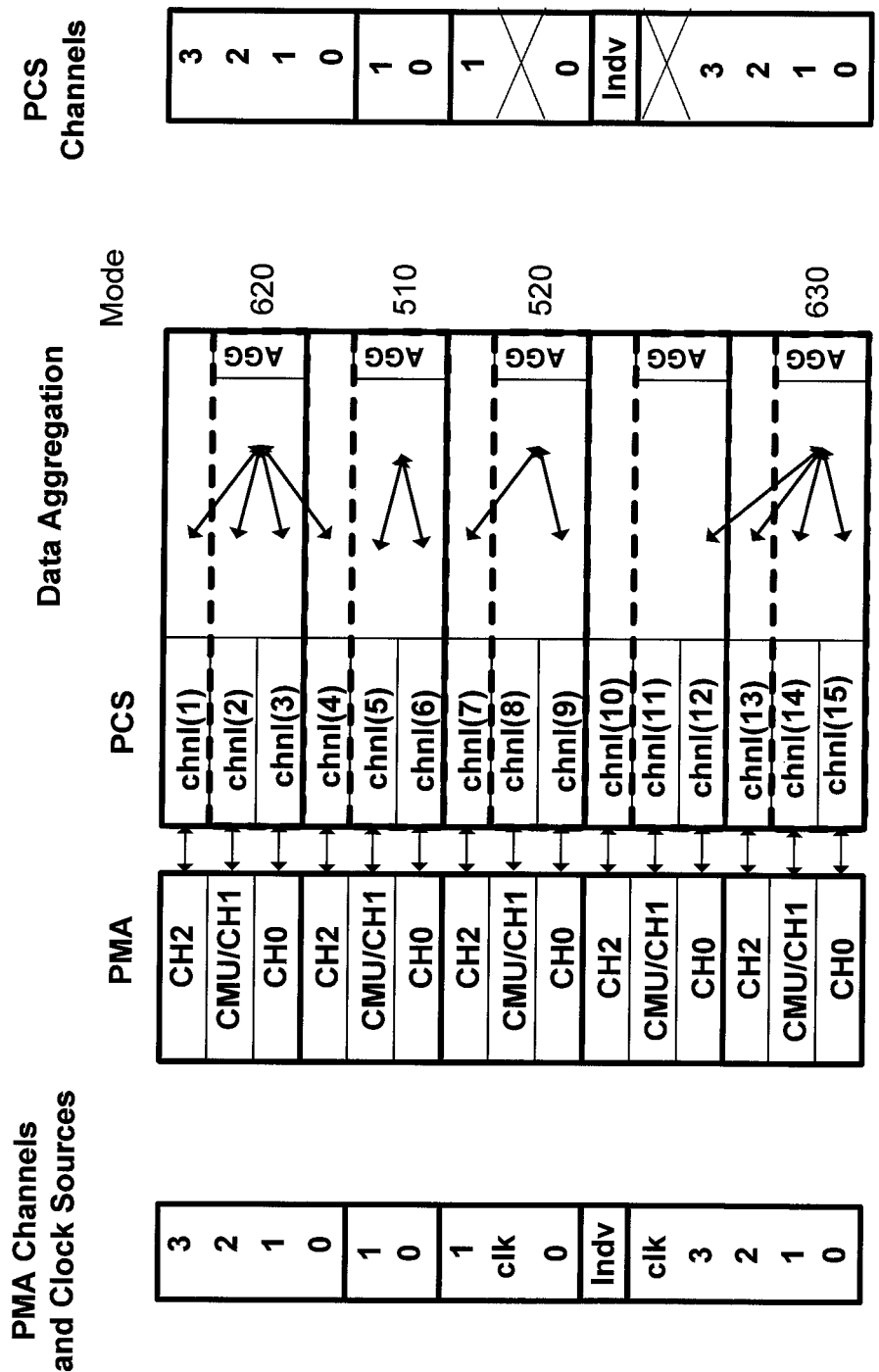
FIG. 9 shows an example array of fifteen serial channels where two pairs of channels are x2 data aggregation bonded and two quadruplets of channels are x4 data aggregation bonded in accordance with an embodiment of the invention.

FIG. 9 shows an example array of fifteen serial channels where two pairs of channels are x2 data aggregation bonded and two quadruplets of channels are x4 data aggregation bonded in accordance with an embodiment of the invention. The bonding shown in FIG. 9 is an example of how the flexible circuit architecture may be used to configure a variety of bonding schemes in a mix-and-match manner.

As shown in FIG. 9, chnl(12) through chnl(15) are x4 data-aggregation bonded. This may be accomplished, for example, by having MUX/DEMUX circuitry interconnected with those channels in configuration mode 630 as described above in relation to FIG. 6C. In addition, chnl(7) and chnl(9) are x2 data-aggregation bonded by having MUX/DEMUX circuitry interconnected with those channels in configuration mode 520 as described above in relation to FIG. 5B. Chnl(5) and chnl(6) are x2 data-aggregation bonded by having MUX/DEMUX circuitry interconnected with those channels in configuration mode 510 as described above in relation to FIG. 5A. Finally, chnl(1) through chnl(4) are x4 data-aggregation bonded by having MUX/DEMUX circuitry interconnected with those channels in configuration mode 620 as described above in relation to FIG. 6B. In this case, eight of the fifteen data channels are used to form two x4 data-aggregation bonded connections, and four channels are used to form two x2 data-aggregation bonded connections. In addition, one channel, chnl(10) may be used to form a single channel connection ("indv"). The two remaining channels, chnl(8) and chnl(11), each correspond to middle channels (CMU/CH1) of a PMA triplet and may be utilized as two clock sources ("clk").

A flexible circuit architecture for control plane bonding is now described. Control plane bonding is also described in U.S. patent application Ser. No. 12/427,960, entitled "Scalable Channel Bundling with Adaptable Channel Synchronization," filed Apr. 22, 2009, by Keith Duwel et al.

Figure 10A:
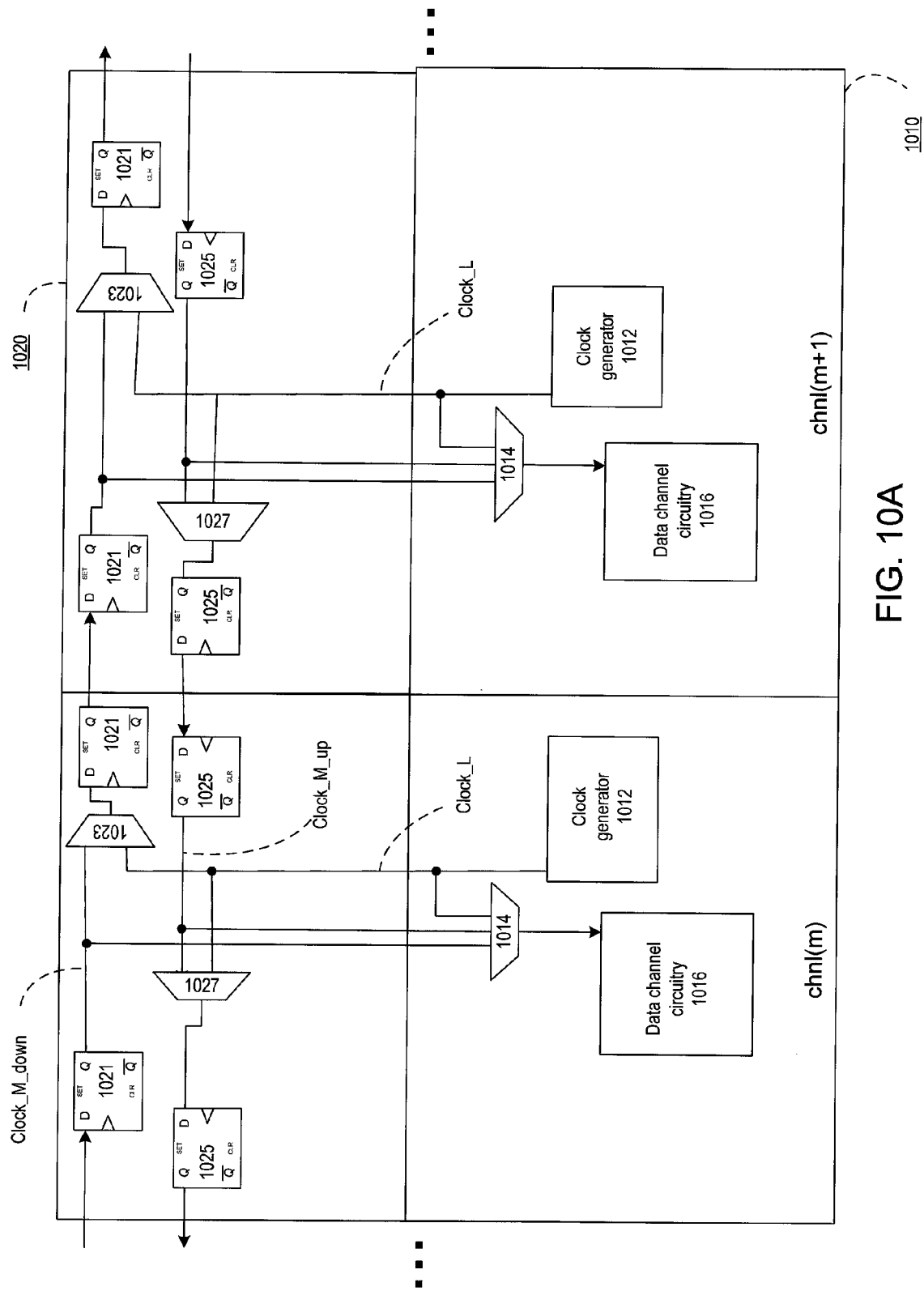
FIGS. 10A and 10B show example clock and control signal distribution circuitry for bundling data channels in accordance with an embodiment of the invention.
Figure 10B:
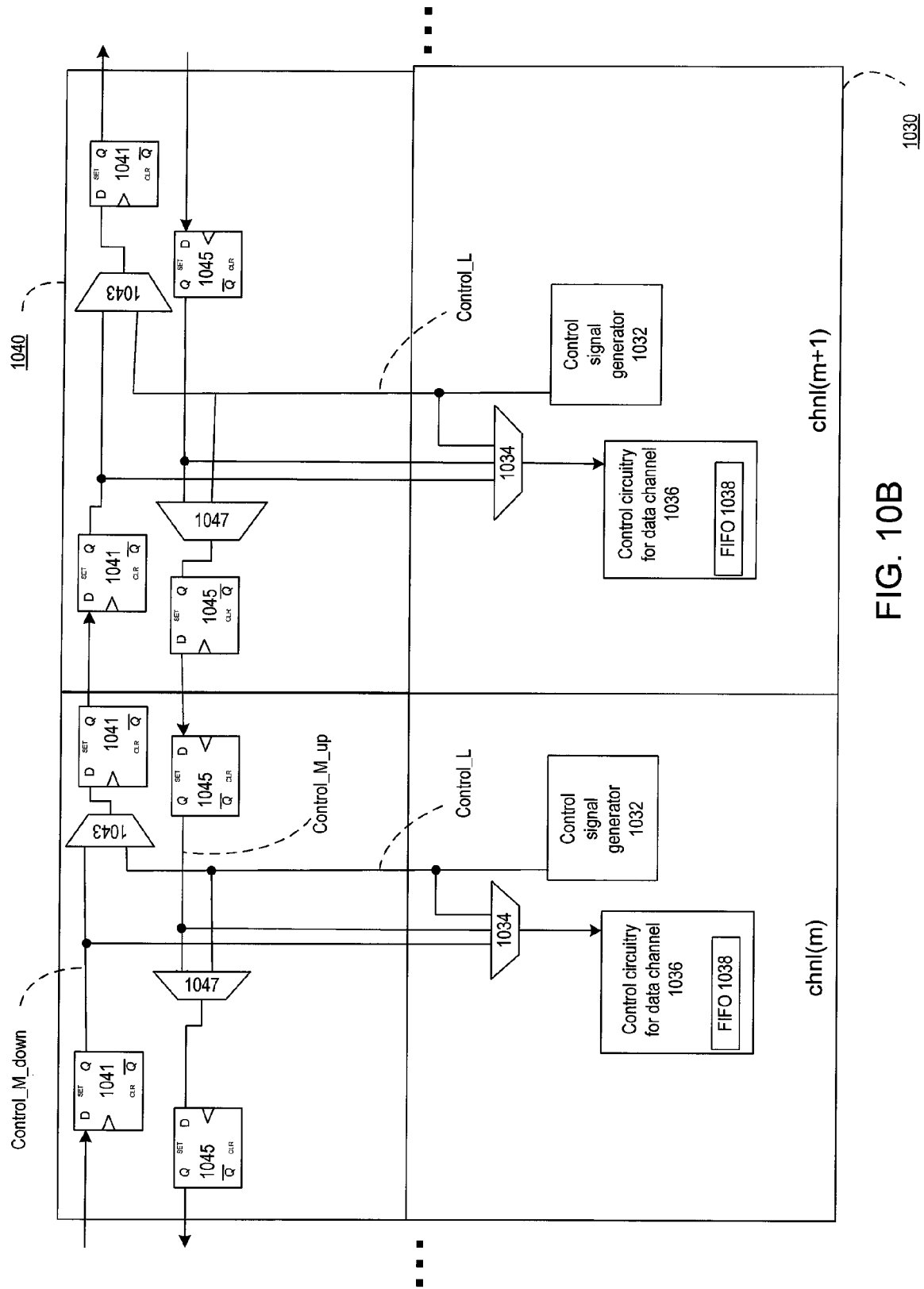

An example of clock and control signal distribution circuitry is depicted in FIGS. 10A and 10B. FIG. 10A shows an example of the clock distribution circuitry for the PCS channels denoted chnl(m) and chnl(m+1). FIG. 10B shows an example of the control distribution circuitry for the PCS channels denoted chnl(m) and chnl(m+1).

As shown in FIG. 10A, bi-directional segmentable clock distribution circuitry 1020 may be coupled to circuitry 1010 for each PCS channel. The circuitry for each PCS channel may include a clock generator 1012 and a programmable channel clock selector 1014. For each channel, the clock generator 1012 may generate a local clock signal, denoted Clock_L.

The local clock signal is provided to a first chain of circuits which may be programmable to distribute the clock signal "downstream" to higher numbered channels in the array. The first chain of circuits may include, for example, registers 1021 and programmable downstream clock selectors 1023. The downstream clock selector 1023 for chnl(m) may be programmed to select either the downstream master clock signal (Clock_M_down) provided by the next lower-numbered channel [i.e. by chnl(m−1)], or the local clock signal (Clock_L) generated by chnl(m). The selected clock signal is provided as the downstream master clock signal to the next higher-numbered channel [i.e. to chnl(m+1)].

Similarly, the local clock signal is provided to a second chain of circuits which may be programmable to distribute the clock signal "upstream" to higher numbered channels in the array. The second chain of circuits may include, for example, registers 1025 and programmable upstream clock selectors 1027. The upstream clock selector 1027 for chnl(m) may be programmed to select either the upstream master clock signal (Clock_M_up) provided by the next higher-numbered channel [i.e. by chnl(m+1)], or the local clock signal (Clock_L) generated by chnl(m). The selected clock signal is provided as the upstream master clock signal to the next lower-numbered channel [i.e. to chnl(m−1)].

The channel clock selector 1014 may be programmed to select either the local clock signal generated by that channel (Clock_L), or the downstream master clock signal (Clock_M_down), or the upstream master clock signal (Clock_M_up). The selected clock signal is provided for use by other data channel circuitry 1016.

As shown in FIG. 10B, bi-directional segmentable control-signal distribution circuitry 1040 may be coupled to circuitry 1030 for each PCS channel. The circuitry for each PCS channel may include a control-signal generator 1032 and a programmable channel control-signal selector 1014. For each channel, the control-signal generator 1012 may generate a local clock signal, denoted Control_L.

The local control signal is provided to a first chain of circuits which may be programmable to distribute the control signal "downstream" to higher numbered channels in the array. The first chain of circuits may include, for example, registers 1041 and programmable downstream control-signal selectors 1043. The downstream control-signal selector 1043 for chnl(m) may be programmed to select either the downstream master control signal (Control_M_down) provided by the next lower-numbered channel [i.e. by chnl(m−1)], or the local control signal (Control_L) generated by chnl(m). The selected control signal is provided as the downstream master control signal to the next higher-numbered channel [i.e. to chnl(m+1)].

Similarly, the local control signal is provided to a second chain of circuits which may be programmable to distribute the control signal "upstream" to higher numbered channels in the array. The second chain of circuits may include, for example, registers 1045 and programmable upstream clock selectors 1047. The upstream control-signal selector 1047 for chnl(m) may be programmed to select either the upstream master control signal (Control_M_up) provided by the next higher-numbered channel [i.e. by chnl(m+1)], or the local control signal (Control_L) generated by chnl(m). The selected control signal is provided as the upstream master control signal to the next lower-numbered channel [i.e. to chnl(m−1)].

The channel control-signal selector 1034 may be programmed to select either the local control signal generated by that channel (Control_L), or the downstream master control signal (Control_M_down), or the upstream master control signal (Control_M_up). The selected control signal is provided for use by control circuitry for data channel circuitry 1036.

While the distribution of a generic control signal is discussed above in relation to FIG. 10B for purposes of illustration, one is to understand that various necessary control signals may be programmably distributed using such circuitry. Such control signals may include, for example, a read enable signal and a write enable signal. Such read and write enable signals may be utilized in conjunction, for example, with write and read FIFO buffers 1038. In that case, for example, when the write enable signal is high, then write control circuitry for the write FIFO may generate a write pointer signal which has a value corresponding to a particular location in the write FIFO buffer. Similarly, when the read enable signal is high, then read control circuitry for the read FIFO may generate a read pointer signal which has a value corresponding to a particular location in read FIFO buffer.

Note that certain serial communication protocols require control—signal PCS channel bonding but do not require PCS data-aggregation bonding. Such protocols do not require processing by the data aggregation circuitry disclosed herein.

Other serial communication protocols require both control-signal PCS channel bonding and PCS data-aggregation bonding. These protocols include, for example, XAUI. Such protocols utilize processing by the data aggregation circuitry.

Figure 11:
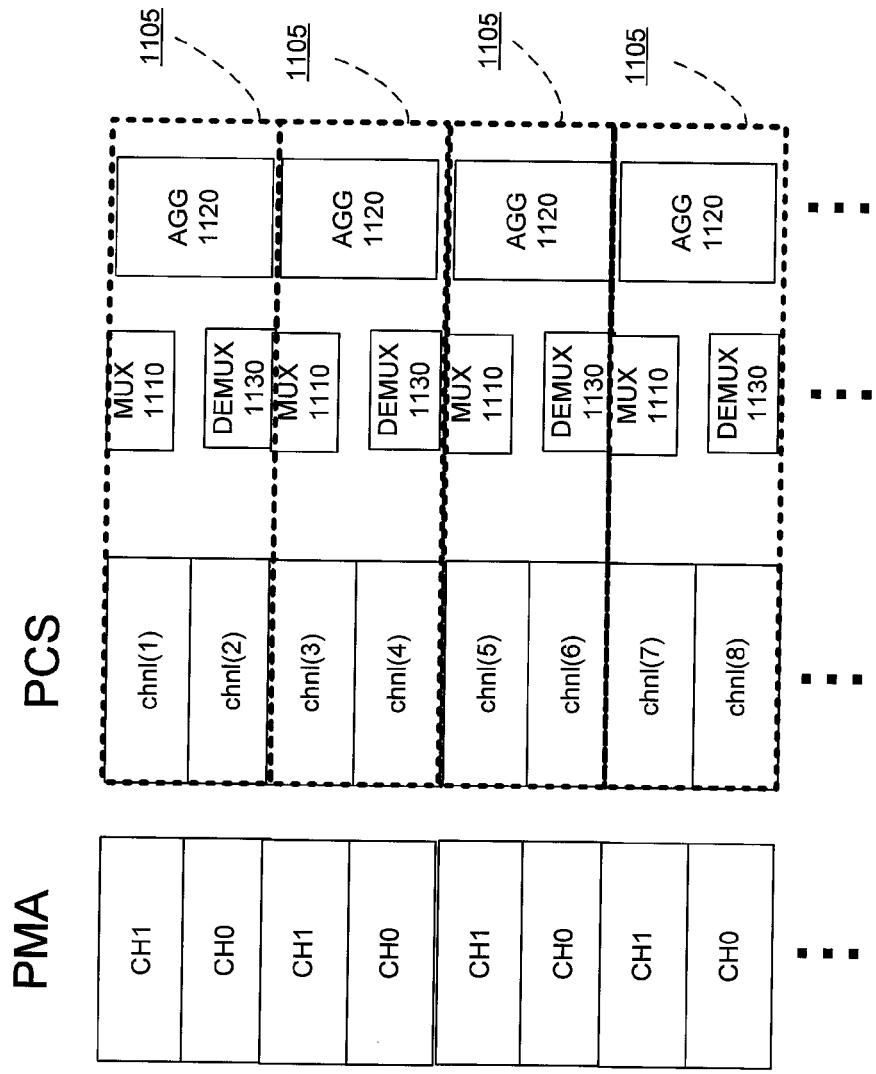
FIG. 11 depicts an alternate embodiment of the circuit modules for data aggregation coupled to an array of serial channels.

FIG. 11 depicts an alternate embodiment of the circuit modules for data aggregation coupled to an array of serial channels. In this embodiment, the PMA circuits are arranged into two-channel modules, each module including a pair of channels, CH0 and CH1. Correspondingly, the PCS circuits are also arranged into two-channel PCS modules 1105. Each two-channel PCS module 1105 includes three additional circuit blocks. The three additional circuit blocks are a channel multiplexer (MUX) 1110, data aggregation circuits and logic (AGG) 1120, and a channel demultiplexer (DEMUX) 1130. These additional blocks are similar to the three additional blocks (210, 220, and 230) of FIG. 2. However, as shown in FIGS. 12A and 12B, the MUX/DEMUX circuit blocks are each interconnected with four PCS channels.

Figure 12A:
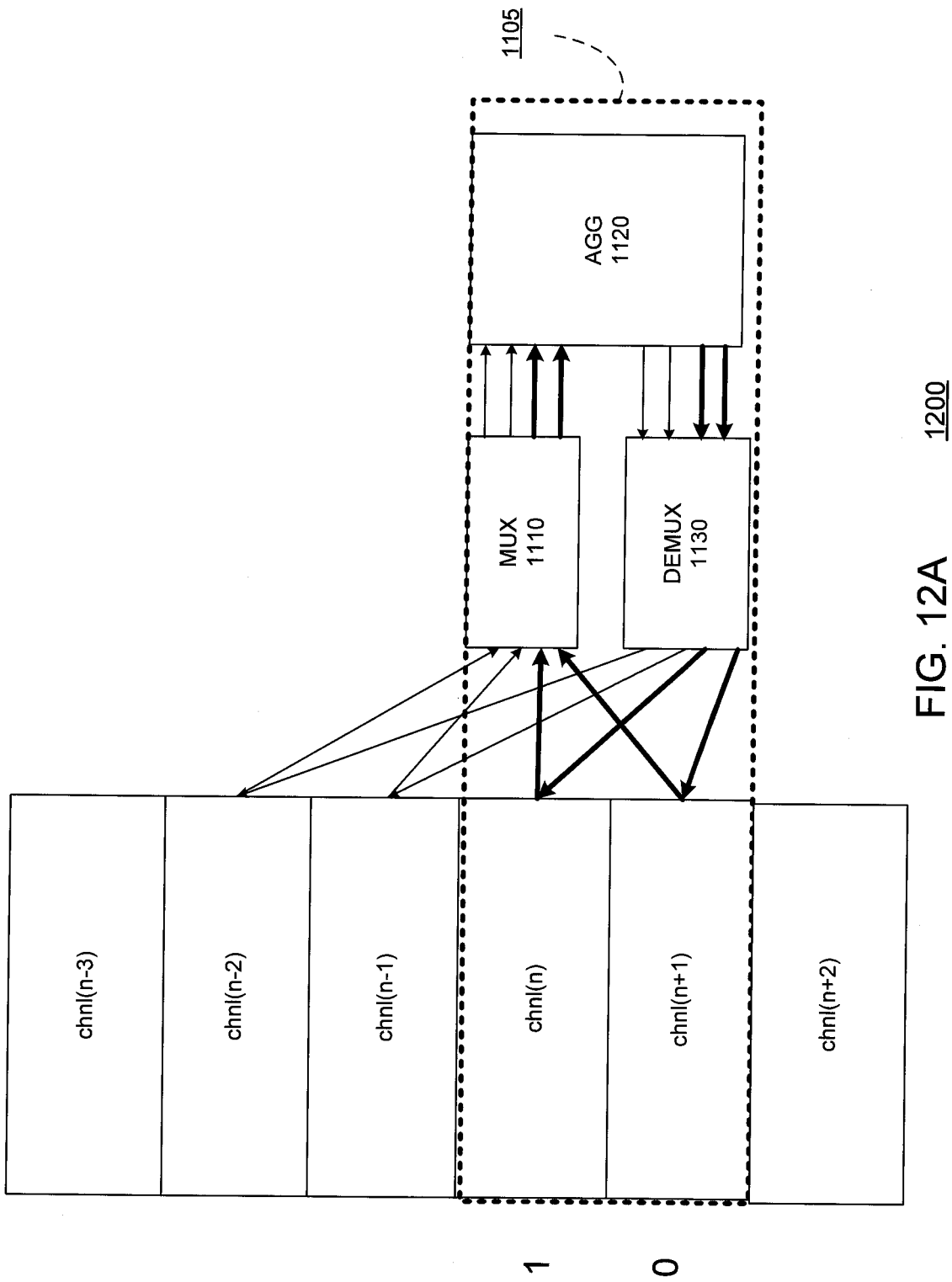
FIG. 12A depicts a multiplexer configuration mode for x2 data aggregation bonding in accordance with the alternate embodiment.

FIG. 12A depicts a multiplexer configuration mode 1200 for x2 data-aggregation bonding in accordance with the alternate embodiment. The multiplexer configuration mode 1200 shown in FIG. 12A may be used for the data-aggregation bonding of a pair of data channels (i.e. for x2 data-aggregation bonding). In this case, MUX 1110 of PCS module 1105 is configured to select channels chnl(n+1) and chnl(n) such that data signals from those channels are passed to two of the channel inputs of data-aggregation circuit block 1120. Correspondingly, DEMUX 1130 of the same PCS module 1105 is configured such that two of the channel outputs of the data-aggregation circuit block 1120 are passed back to the selected channels chnl(n+1) and chnl(n). This configuration is shown by the thicker arrows going from chnl(n+1) and chnl(n) to MUX 1110 and the thicker arrows going from DEMUX 1130 back to chnl(n+1) and chnl(n). (The thinner arrows represent connections to channels which are not selected by the MUX 1110 and DEMUX 1130.) In addition, the "0" next to chnl(n+1) and the "1" next to chnl(n) indicate that those channels are x2 bonded.

Figure 12B:
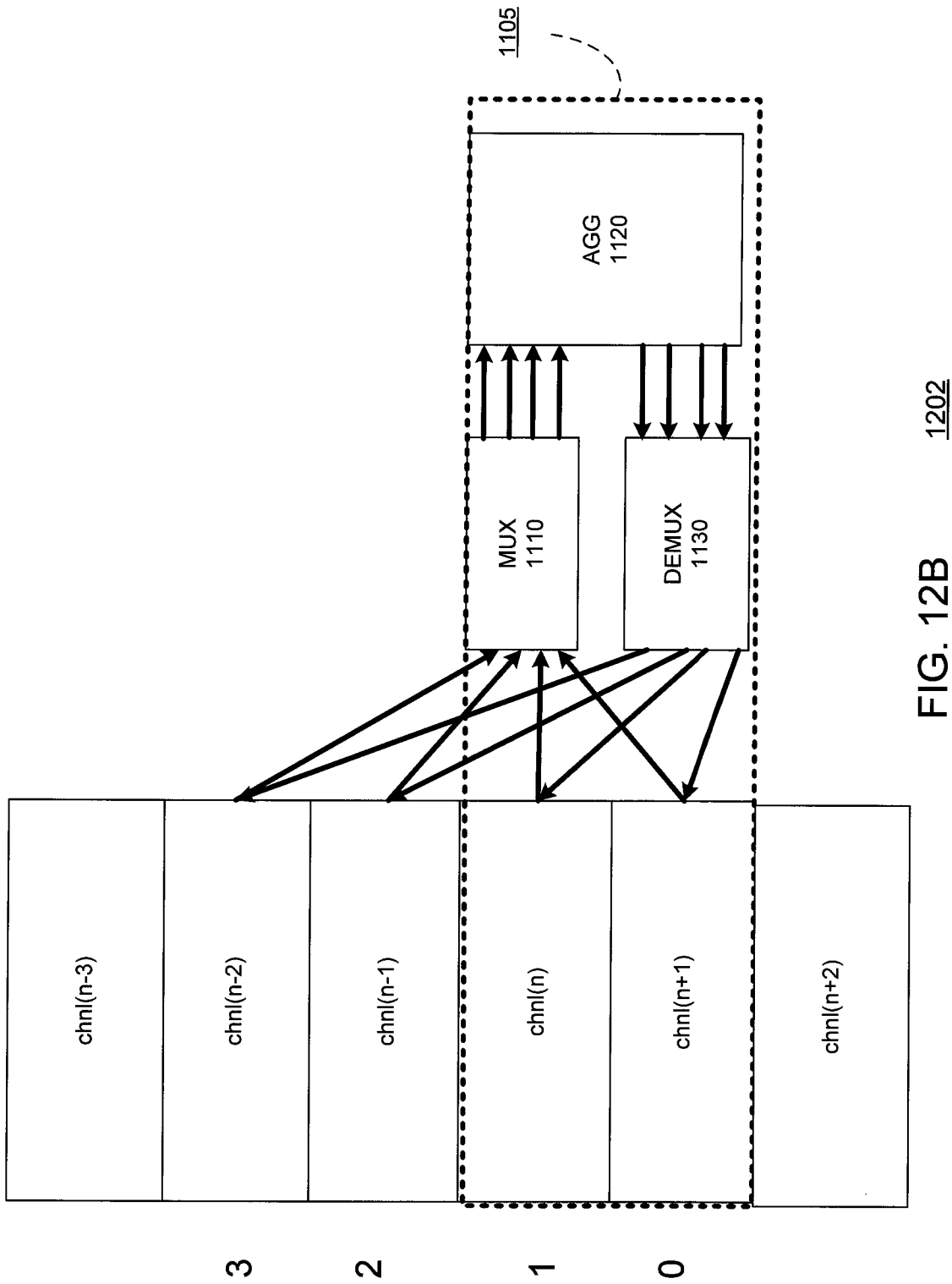
FIG. 12B depicts a multiplexer configuration mode for x4 data aggregation bonding in accordance with the alternate embodiment.

FIG. 12B depicts a multiplexer configuration mode 1202 for x4 data-aggregation bonding in accordance with the alternate embodiment. The multiplexer configuration mode 1202 shown in FIG. 12B may also be used for the data-aggregation bonding of four data channels. In this case, MUX 1110 is configured to select channels chnl(n+1), chnl(n), chnl(n−1), and chnl(n−2) such that data signals from those channels are passed to the four channel inputs of data-aggregation circuit block 1120. Correspondingly, DEMUX 1130 is configured such that the four channel outputs of the data-aggregation circuit block 1120 are passed back to the selected channels chnl(n+1) through chnl(n−2). This configuration is shown by the thicker arrows going from chnl(n+1) through chnl(n−2) to MUX 1110 and the thicker arrows going from DEMUX 1130 back to chnl(n+1) through chnl(n−2). In addition, the "0" next to chnl(n+1), the "1" next to chnl(n), the "2" next to chnl(n−1), and the "3" next to chnl(n−2) indicate that those four channels are x4 bonded.

Figure 13:
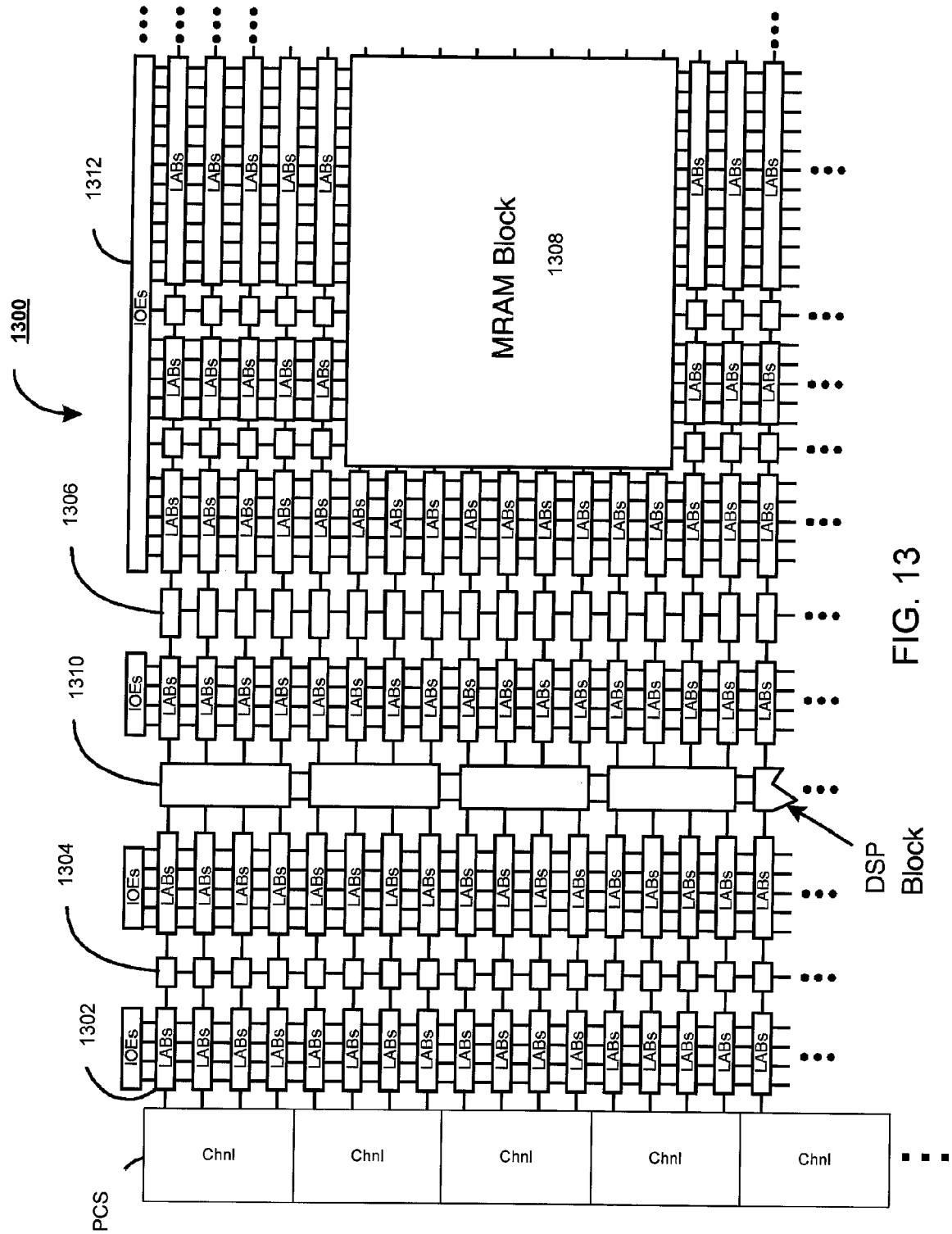
FIG. 13 is a simplified partial block diagram of a field programmable gate array (FPGA) that can include aspects of the present invention.

FIG. 13 is a simplified partial block diagram of a field programmable gate array (FPGA) 1300 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), and application specific integrated circuits (ASICs).

FPGA 1300 includes a two-dimensional array of programmable logic array blocks (or LABs) 1302 that are interconnected by a network of column and row interconnect conductors of varying length and speed. LABs 1302 include multiple (e.g., 10) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 1300 also includes a distributed memory structure including random access memory (RAM) blocks of varying sizes provided throughout the array. The RAM blocks include, for example, blocks 1304, blocks 1306, and block 1308. These memory blocks can also include shift registers and FIFO buffers.

FPGA 1300 further includes digital signal processing (DSP) blocks 1310 that can implement, for example, multipliers with add or subtract features. Input/output elements (IOEs) 1312 located, in this example, around the periphery of the chip support numerous single-ended and differential input/output standards. Each IOE 1312 is coupled to an external terminal (i.e., a pin) of FPGA 1300. The above-discussed PCS channel array may be arranged as shown, for example. It is to be understood that FPGA 1300 is described herein for illustrative purposes only and that the present invention can be implemented in many different types of PLDs, FPGAs, and ASICs.

Figure 14:
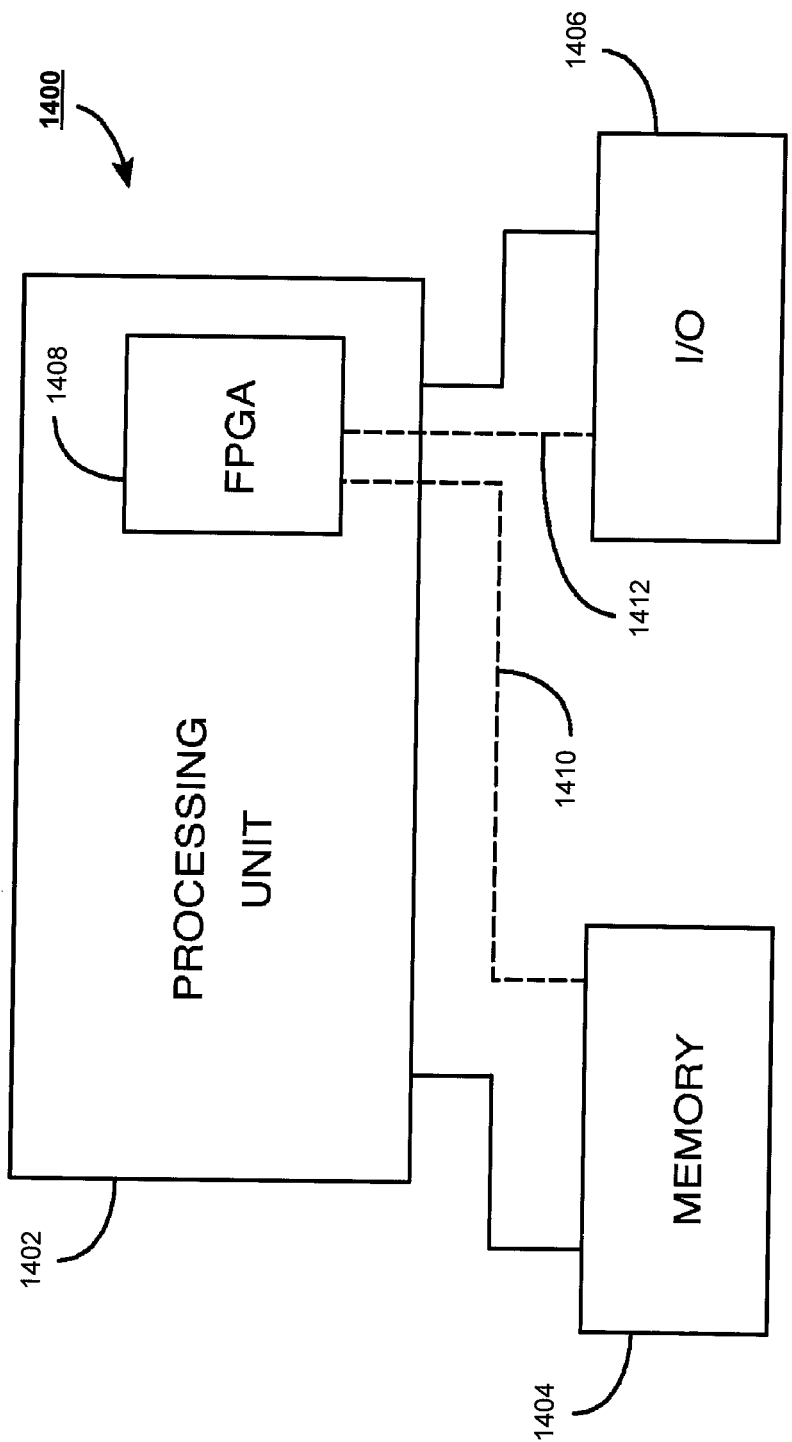
FIG. 14 shows a block diagram of an exemplary digital system that can embody techniques of the present invention.

The present invention can also be implemented in a system that has a FPGA as one of several components. FIG. 14 shows a block diagram of an exemplary digital system 1400 that can embody techniques of the present invention. System 1400 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 1400 may be provided on a single board, on multiple boards, or within multiple enclosures.

System 1400 includes a processing unit 1402, a memory unit 1404, and an input/output (I/O) unit 1406 interconnected together by one or more buses. According to this exemplary embodiment, FPGA 1408 is embedded in processing unit 1402. FPGA 1408 can serve many different purposes within the system in FIG. 14. FPGA 1408 can, for example, be a logical building block of processing unit 1402, supporting its internal and external operations. FPGA 1408 is programmed to implement the logical functions necessary to carry on its particular role in system operation. FPGA 1408 can be specially coupled to memory 1404 through connection 1410 and to I/O unit 1406 through connection 1412.

Processing unit 1402 may direct data to an appropriate system component for processing or storage, execute a program stored in memory 1404, receive and transmit data via I/O unit 1406, or other similar function. Processing unit 1402 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 1408 may control the logical operations of the system. As another example, FPGA 1408 acts as a reconfigurable processor that may be reprogrammed as needed to handle a particular computing task. Alternately, FPGA 1408 may itself include an embedded microprocessor. Memory unit 1404 may be a random access memory (RAM), read only memory (ROM), fixed or flexible disk media, flash memory, tape, or any other storage means, or any combination of these storage means.

Figure 15:
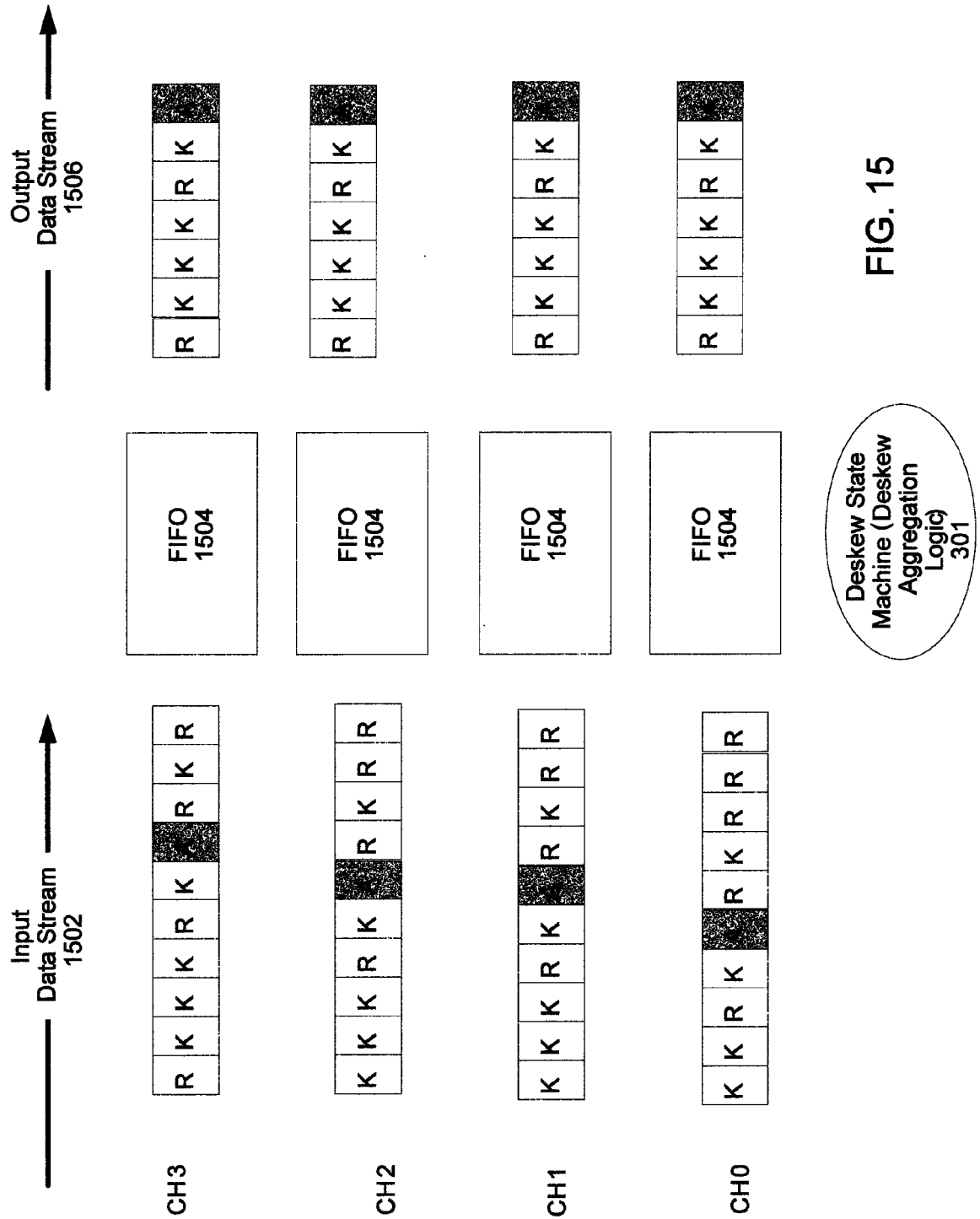
FIG. 15 is a diagram illustrating an example deskew operation that may be performed by a deskew state machine in accordance with an embodiment of the invention.

FIG. 15 is a diagram illustrating an example deskew operation that may be performed by a deskew state machine (deskew aggregator logic) 301 in accordance with an embodiment of the invention. The figure shows input data streams 1502 into first-in-first-out memory buffers (FIFO) 1504 for four channels (CH0, CH1, CH2, and CH3) and output streams 1506 for the same four channels.

The deskew aggregator logic 301 performs data alignment between channels based on an align character denoted |A|, for example, for each individual channel. The deskew state machine 301 controls the buffering of data into the FIFO memory buffers 1504 and reading out the buffered data from the FIFO memory buffers 1504. The reading out of the buffered data is controlled based on the indication of |A| found by each individual channel. When circuitry for a channel finds an align character |A|, the FIFO memory buffer 1504 for that channel starts buffering the |A| and the bytes following it, and an indication is sent to the deskew state machine 301. The deskew state machine 301 waits for the indication of the alignment character |A| from each channel and then enables reading out of the FIFO memory buffers 1504 in all channels. As a result, the output data streams 1506 for the four channels are aligned. Once the initial channel alignment is achieved, the aggregator logic (for protocol-specific or proprietary state machines) also keeps detecting if the data after initial alignment stays in an aligned state. If the data becomes out of alignment, the deskew state machine 301 may be arranged to start the alignment process again.

Figure 16:
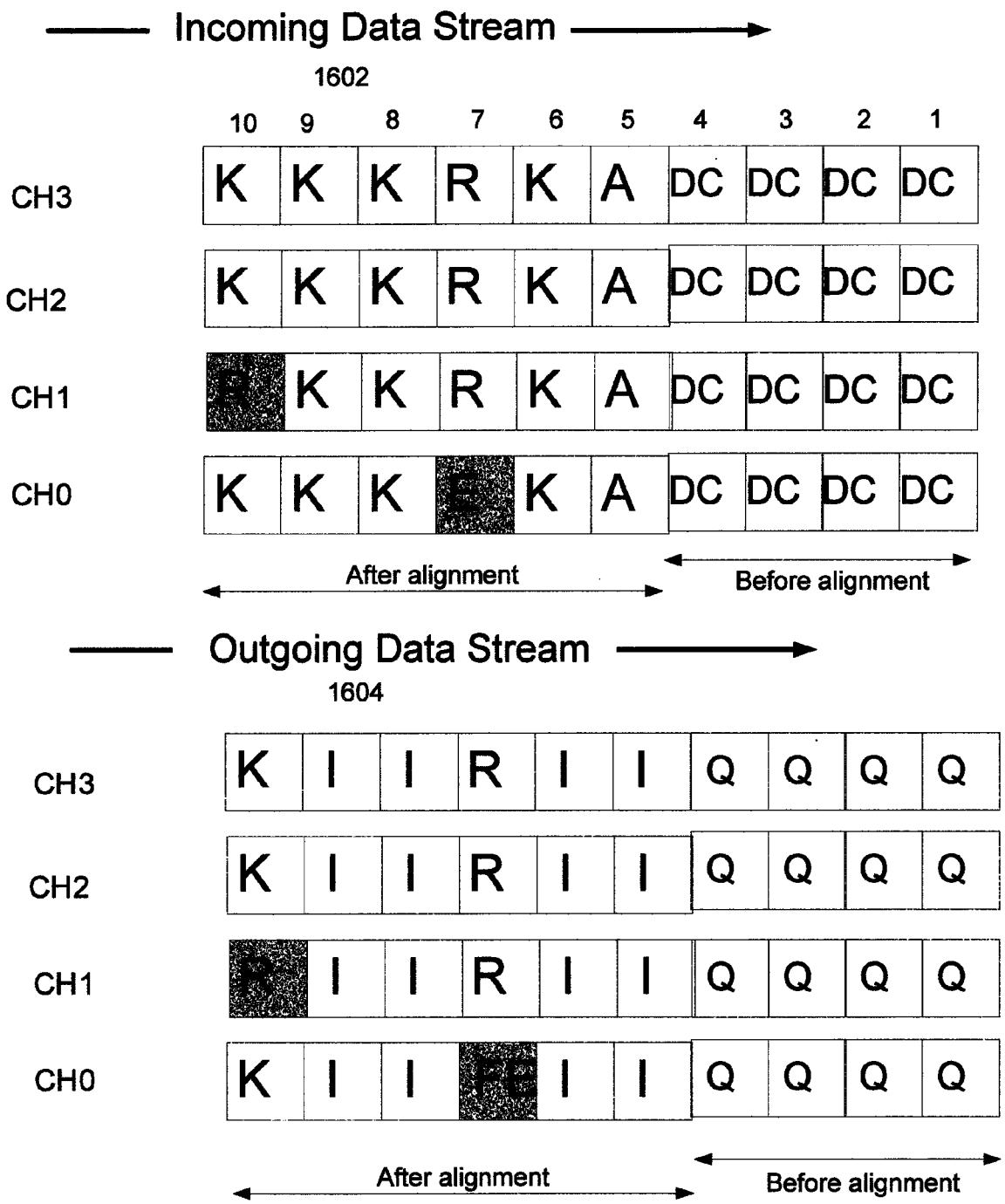
FIG. 16 is a diagram illustrating an example transformation that may be performed by a receive state machine of a data aggregator in accordance with an embodiment of the invention.

FIG. 16 is a diagram illustrating an example transformation that may be performed by a receive state machine 304 of a data aggregator 220 in accordance with an embodiment of the invention. The figure shows an example of input data streams 1602 and output data streams 1604 for four channels (CH0, CH1, CH2, and CH3).

In this case, the incoming data streams 1602 for the four channels are monitored in aggregate by the data aggregator 220 so as to determine if a conversion (transformation) is to be performed. The transformation(s) is (are) performed prior to the data being sent up to upper layers in the protocol stack.

In this example, before all the channels are aligned (i.e. before a deskew operation is successfully done), the receive state machine 304 replaces the characters with local faults (as indicated by the columns with the |Q| symbols in FIG. 16). Since local faults are indicated regardless of the input data, the input columns before alignment are indicated as "don't care" (DC). Once the channels are aligned, the receive state machine 304:

(a) Checks the channels to see if the channels have the same characters and no errors. If so, then the receive state machine 304 transforms the inter-packet gap (IPG) characters |A|, |K|, and |R| to idle columns (as indicated by the columns with the |I| characters). This conversion after achieving alignment is depicted in columns labeled 5, 6, 8 and 9 in FIG. 16.

(b) If a data channel has an error (as indicated by the |E| symbol in FIG. 16), then the receive state machine 304 replaces the error character with a specified error character or pattern. In the particular example shown in FIG. 16, the error character is replaced by the |FE| character, which is the error pattern specified per the XAUI specification, and the remaining characters remain untouched. This replacement of the error character with the specified error pattern is depicted in the column labeled 7 in FIG. 16, where the |E| symbol is replaced by the |FE| character.

(c) During the IPG, if all channels do not have the same character, then each channel leaves the characters untouched and outputs the same characters that were received. This is shown in the column labeled 10 in FIG. 16, where the |K|, |K|, |R|, and |K| characters are output as they were received.

The above description discloses various embodiments and features of the present invention. The following summarizes some of the disclosed embodiments. Other embodiments and features are also disclosed.

One embodiment relates to an integrated circuit (IC) with a programmable high-speed serial interface including a plurality of data channels. a programmable high-speed serial interface including a plurality of data channels. The IC includes a plurality of PMA channel circuits (each PMA channel circuit being associated with a data channel), a plurality of PCS circuits (each PCS channel circuit being associated with a PMA channel circuit), and at least one data aggregation module. A channel multiplexer circuit is coupled to multiple PCS channel circuits and to the data aggregation module, and a channel demultiplexer circuit is coupled to the data aggregation module and to the multiple PCS channel circuits. The channel multiplexer circuit is programmable to provide in a flexible manner data from a subset of the multiple PCS channel circuits to inputs of the data aggregation module, while the channel demultiplexer circuit is programmable to provide data from outputs of the data aggregation module to said subset of the multiple PCS channel circuits.

Another embodiment relates to a method of providing flexible aggregation of data channels for a high-speed serial interface of an integrated circuit. A multiplexer circuit is configured to select a subset of data channel circuits to be bonded such that data from the subset is provided as input data to a data aggregation circuit module. In addition, a demultiplexer circuit is configured such that output data from the data aggregation circuit module is provided back to the same subset of data channels.

Another embodiment relates to an integrated circuit comprising a programmable high-speed serial interface including a plurality of data channels. The IC includes an array of channel circuits, each channel circuit being associated with a data channel. Segmentable clock distribution circuitry is included which is configurable to distribute divided down master clock signals to different segments of the array of channel circuits. In addition, segmentable control-signal distribution circuitry is included which is configurable to distribute different master control signals to different segments of the array of channel circuits.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. An integrated circuit comprising:
a high-speed serial interface including a plurality of data channels; a plurality of serial channel circuits, each serial channel circuit being associated with a data channel;
a data aggregation module;
a channel multiplexer circuit coupled to multiple serial channel circuits and to the data aggregation module, wherein the channel multiplexer circuit is programmed to provide data from a subset of the multiple serial channel circuits to inputs of the data aggregation module; and
a channel demultiplexer circuit coupled to the data aggregation module and to the multiple serial channel circuits, wherein the channel demultiplexer circuit is programmed to provide data from outputs of the data aggregation module to said subset of the multiple serial channel circuits;
bi-directional clock distribution circuitry configured to distribute a master clock signal to each of the multiple serial channel circuits which are coupled to the channel multiplexer and demultiplexer circuits; and
wherein each serial channel circuit includes a clock signal generator which generates a clock signal that is programmed to be used as either a local clock signal for that serial channel circuit or as a master clock signal for other serial channel circuits.

2. The integrated circuit of claim 1, wherein each serial channel circuit comprises a physical media attachment (PMA) channel circuit and a physical coding sublayer (PCS) channel circuit.

3. The integrated circuit of claim 1, wherein the integrated circuit comprises a field programmable gate array.

4. The integrated circuit of claim 1, wherein the data aggregation module includes a deskew state machine and rate match circuitry.

5. The integrated circuit of claim 4, wherein the data aggregation module further includes receive and transmit state machines.

6. The integrated circuit of claim 1, wherein the integrated circuit includes a plurality of data aggregation modules and corresponding channel multiplexer and demultiplexer circuits.

7. The integrated circuit of claim 1, wherein the channel multiplexer and demultiplexer circuits are configurable so as to provide data-aggregation bonding for two adjacent serial channel circuits in an array.

8. The integrated circuit of claim 1, wherein the channel multiplexer and demultiplexer circuits are configured so as to provide data-aggregation bonding for two non-adjacent serial channel circuits in an array.

9. The integrated circuit of claim 8, wherein a serial channel circuit in between said two non-adjacent serial channel circuits is configured as a clock source and not as a transceiver channel.

10. The integrated circuit of claim 1, wherein the channel multiplexer and demultiplexer circuits are configured so as to provide data-aggregation bonding for four adjacent serial channel circuits in an array.

11. The integrated circuit of claim 1, wherein the channel multiplexer and demultiplexer circuits are configured so as to provide data-aggregation bonding for four serial channel circuits which are not all adjacent to each other in an array.

12. The integrated circuit of claim 11, wherein a channel circuit in between two of the four serial channel circuits is configured as a clock source and not as a transceiver channel.

13. An integrated circuit comprising:
a high-speed serial interface including a plurality of data channels;
a plurality of serial channel circuits, each serial channel circuit being associated with a data channel;
a data aggregation module;
a channel multiplexer circuit coupled to multiple serial channel circuits and to the data aggregation module, wherein the channel multiplexer circuit is programmed to provide data from a subset of the multiple serial channel circuits to inputs of the data aggregation module; and
a channel demultiplexer circuit coupled to the data aggregation module and to the multiple serial channel circuits, wherein the channel demultiplexer circuit is proqrammed to provide data from outputs of the data aggregation module to said subset of the multiple serial channel circuits; and bi-directional control-signal distribution circuitry configured to distribute a master control signal to each of the multiple serial channel circuits which are coupled to the channel multiplexer and demultiplexer circuits, wherein each serial channel circuit includes a control signal generator which generates a control signal that is programmed to be used as either a local control signal for that serial channel circuit or a master control signal for other serial channel circuits.

14. The integrated circuit of claim 13, wherein each serial channel circuit comprises a physical media attachment (PMA) channel circuit and a physical coding sublayer (PCS) channel circuit.

15. The integrated circuit of claim 13, wherein the integrated circuit comprises a field programmable gate array.

16. The integrated circuit of claim 13, wherein the data aggregation module includes a deskew state machine and rate match circuitry.

17. The integrated circuit of claim 16, wherein the data aggregation module further includes receive and transmit state machines.

18. The integrated circuit of claim 13, wherein the integrated circuit includes a plurality of data aggregation modules and corresponding channel multiplexer and demultiplexer circuits.

19. The integrated circuit of claim 13, wherein the channel multiplexer and demultiplexer circuits are configured so as to provide data-aggregation bonding for two adjacent serial channel circuits in an array.

20. The integrated circuit of claim 13, wherein the channel multiplexer and demultiplexer circuits are configured so as to provide data-aggregation bonding for two non-adjacent serial channel circuits in an array.

21. The integrated circuit of claim 13, wherein a serial channel circuit in between said two non-adjacent serial channel circuits is configured as a clock source and not as a transceiver channel.

22. The integrated circuit of claim 13, wherein the channel multiplexer and demultiplexer circuits are configured so as to provide data-aggregation bonding for four adjacent serial channel circuits in an array.

23. The integrated circuit of claim 13, wherein the channel multiplexer and demultiplexer circuits are configured so as to provide data-aggregation bonding for four serial channel circuits which are not all adjacent to each other in an array.

24. The integrated circuit of claim 23, wherein a channel circuit in between two of the four serial channel circuits is configured as a clock source and not as a transceiver channel.

* * * * *